United States Patent
Brown

(10) Patent No.: US 11,778,242 B2
(45) Date of Patent: Oct. 3, 2023

(54) LIVE INDEPENDENT CONTENT MASS THEATRICAL DISTRIBUTION SYSTEM AND BACK-OFFICE SERVICES SUITE MODEL

(71) Applicant: Wisemen Multimedia LLC, Chamblee, GA (US)

(72) Inventor: Eric Vincent Brown, Alpharetta, GA (US)

(73) Assignee: Wisemen Multimedia LLC, Chamblee, GA (US)

( * ) Notice: Subject to any disclaimer, the term of this patent is extended or adjusted under 35 U.S.C. 154(b) by 0 days.

(21) Appl. No.: 17/703,022

(22) Filed: Mar. 24, 2022

(65) Prior Publication Data

US 2022/0312046 A1     Sep. 29, 2022

Related U.S. Application Data

(60) Provisional application No. 63/165,831, filed on Mar. 25, 2021.

(51) Int. Cl.
| | |
|---|---|
| *H04N 21/2187* | (2011.01) |
| *H04N 21/2347* | (2011.01) |
| *H04N 21/6405* | (2011.01) |
| *H04N 21/2389* | (2011.01) |
| *H04N 21/81* | (2011.01) |
| *H04N 21/4405* | (2011.01) |

(52) U.S. Cl.
CPC ..... *H04N 21/2187* (2013.01); *H04N 21/2347* (2013.01); *H04N 21/23892* (2013.01); *H04N 21/4405* (2013.01); *H04N 21/6405* (2013.01); *H04N 21/812* (2013.01)

(58) Field of Classification Search
CPC .................................................. H04N 21/2187
See application file for complete search history.

(56) References Cited

U.S. PATENT DOCUMENTS

| | | | |
|---|---|---|---|
| 6,829,612 B2 | 12/2004 | Neulight | |
| 7,448,063 B2 * | 11/2008 | Freeman | G06F 16/40 348/E7.039 |
| 2019/0253742 A1 * | 8/2019 | Garten | H04N 21/2343 |
| 2021/0185407 A1 * | 6/2021 | Marshall | G06Q 30/0275 |

* cited by examiner

*Primary Examiner* — Michael H Hong
(74) *Attorney, Agent, or Firm* — Stinson LLP

(57) ABSTRACT

Apparatus and method for mass distribution of content. A system for mass distribution of content includes a media server configured to receive content comprising a real-time broadcast of a live performance. The media server generates a content signal representative of the received content and a multicast network coupled to the media server encrypts the content signal and multiplies it to generate a multicast signal. The multicast signal, transmitted by a multicast network via the data communication network, comprises a plurality of encrypted unicast signals. One or more receivers are coupled to the multicast network via the data communication network and each receives one of the encrypted unicast signals of the multicast signal via the data communication network. Each of the one or more receivers decrypts the received unicast signal and broadcasts the decrypted unicast signal to one or more entertainment pods for consumption.

9 Claims, 19 Drawing Sheets

LIVE INDEPENDENT CONTENT MASS THEATRICAL DISTRIBUTION SYSTEM AND BACK-OFFICE SERVICES SUITE MODEL

CROSS-REFERENCE TO RELATED APPLICATION

This application claims the benefit of U.S. Provisional Patent Application No. 63/165,831, filed Mar. 25, 2021, the contents of which are incorporated by reference in their entirety for all purposes.

BACKGROUND

This innovation relates to a computer system, specifically, to a computerized business system for the mass distribution of independent live content, multicast via the public internet, for theatrical release to a distributor's compatible theaters.

According to Independent Features Project/West, independent films MUST: (1) be risk-taking in content and style, (2) embody a "personal vision," (3) be funded by "non-Hollywood financing," and (4) embody the "valuation of art over money." Currently, film distributors offer limited theatrical release of independent films. There are no capable platforms that offer mass distribution for the theatrical release of independent films other than Hollywood which has released a limited number annually. Netflix, Hulu, Disney, Amazon Prime Video, and similar streaming platforms plan to invest big in "original content," but that does not mean the content distributed will actually be independent by definition. Other "broadcast you" platforms, for example, YouTube, Instagram, Facebook, and Twitter, have limitations, content restrictions, and typically require individuals to amass a huge following on their own, which does not easily translate into sales.

This lack of a mass distribution system forces independent filmmakers to rely on third-party distributors to bring their works to market but the extremely high cost of promoting a film and reaching a mass audience means film distribution is dominated by a few large corporations. In 2014, the top six major studios accounted for 83% of box office revenues. An estimated 5% of movies released generate about 80% of the film industry's profits. The old Hollywood system before the mid-20$^{th}$ century still exists in part, but instead of studios directly controlling distributions and theaters, they just dominate the distribution system. The problem with this legacy distribution system is that the only films that get distributed are those the big studios believe will be a box office hit. The film industry is a major contributor to the global economy. Independent films are a gateway for increasing empathy; however, they have almost become extinct. Hollywood represents the go to machine for major studio film distribution, but it lacks a sufficient distribution system for independent films.

Independent filmmakers are forced to seek distribution deals in the legacy Hollywood studio-monopolized distribution system where films are not distributed based on their individual merit—they are distributed based on marketability only. The legacy Hollywood studio-monopolized distribution system requires films to have post-production expenses and have a Print and Advertising (P&A) budget which typically exceeds the production budget approximately five to 30 million USD per film. Regarding chronology and monetization, Announcement is defined as the date when it is publicly announced that the film will be made. Often this is when the industry announces that the script has been optioned but could also be when the mainstream press is told that the film will be made. Pre-production is the process by which the film's shoot is planned. The Shoot Start is the first day of principal production when the first scenes are filmed. Post-production usually starts directly after all major scenes have been shot. Release is the North American theatrical release date when a film is shown in theaters to the paying public. The average traditional film production between 2006 and 2020 was announced 871 days before it was eventually in cinemas. Pre-production took 146 days, principal photography took 106 days, and post-production began 301 days before the movie hit the big screen. This is all very time consuming and increases the risk of low return on investment (ROI). Currently, theaters have shut down. For example, Regal Cinemas recently closed all 536 U.S. theaters and furloughed 40,000 employees due to COVID-19. Other large theater chains have followed suit, which negatively impacts box office potential for blockbuster films and has an even greater impact on the potential for the theatrical release of independent films. Traditional theater exhibit halls' average capacity is between 200 and 300 people. Some large theaters will have 20 screens and a capacity of 6,000 people. This size gathering could result in a COVID-19 "super spreader" event. Many films will be released and viewed primarily on streaming platforms and will either not enjoy theatrical release or will have limited distribution due to the impact of the Coronavirus on theaters worldwide.

Another issue with the current legacy Hollywood studio-monopolized distribution system is the distribution targets are theaters that are not pandemic (COVID-19) resilient. Theater chains need a safer design for exhibit halls that reduces the size of indoor crowds and increases the potential for successful social distancing to maintain CDC standards for COVID-19 safety.

From 1999 to 2018, 90.3% of independent films did not have a theatrical release. Of those films released, 6.3% experienced a loss and only 3.4% saw a profit. This is not because independent films and content are not marketable. It is because there is no dedicated mass distribution system for the theatrical release of independent films. Independent films have high potential. Although few have crossed over to the mainstream, the low-budget digital independent film sub-sector has an increasing number of success stories. Several films beat the extraordinary odds and connected with substantial audiences through a variety of distribution methods and exhibition platforms while achieving respectable remuneration. For instance, Tarnation (Caouette, 2003), a film that reportedly cost just $300 to produce, and Four Eyed Monsters (Buice and Crumley, 2005) epitomized what Geoff King has called the 'digital desktop aesthetic.' That is, they were created primarily with non-professional level equipment that provided these generally autobiographical films with a strong identity. Distributed in novel ways, both films attracted significant attention which translated into respectable commercial success, sufficient for the filmmakers to continue making films.

The independent filmmaker needs a computerized, more efficient way to submit a film for mass distribution and theatrical release consideration.

SUMMARY

Aspects of the present invention enable the mass distribution of independent live content. In order to achieve the technical tasks mentioned above, a system for mass distribution of content includes a media server configured to receive content comprising a real-time broadcast of a live performance, the media server generating a content signal representative of the received content. The system also includes a multicast network coupled to the media server, the multicast network encrypting the content signal and multiplying the encrypted content signal to generate a multicast signal. The multicast signal comprises a plurality of encrypted unicast signals and the multicast network transmits the multicast signal via a data communication network to one or more receivers coupled to the multicast network via the data communication network. Each of the one or more receivers receives one of the encrypted unicast signals of the multicast signal via the data communication network, decrypts the received unicast signal, and broadcasts the decrypted unicast signal to one or more entertainment pods for consumption.

The system may include a multiplexer coupled to the media server for combining one or more features with the content, and wherein the content signal generated by the media server is representative of the content combined with the one or more features.

One or more features may include at least one of special effects, video, audio, and a soundtrack.

The content signal generated by the media server may include metadata.

The multicast network may retrieve one or more advertisements based on the metadata and queue the retrieved advertisements for transmission by the multicast network with the multicast signal.

The multicast network may include a Wide Area Network (WAN) for multiplying the encrypted content signal to generate a multicast signal.

The encrypted unicast signals of the multicast signal may include identical packetized video signals.

The system may include a database coupled to the media server storing the metadata, and wherein the metadata comprises live content production data.

The live content production data may include one or more of the following: title, duration, genre, film rating, cast, director, synopsis, budgets, costs, set buildouts, announcements, runtime, schedule, set configurations, technology loadouts, and scene workflows.

In another aspect, a method for mass distribution of content may include receiving, by a media server, content comprising a real-time broadcast of a live performance; generating, by the media server, a content signal representative of the received content; encrypting the content signal by a multicast network coupled to the media server; multiplying the encrypted content signal, by the multicast network, to generate a multicast signal, the multicast signal comprising a plurality of encrypted unicast signals; and transmitting, by the multicast network, the multicast signal via a data communication network to one or more receivers coupled to the multicast network via the data communication network.

The method may further include combining, by a multiplexer coupled to the media server, one or more features with the content, and wherein the content signal generated by the media server is representative of the content combined with the one or more features.

The one or more features may include at least one of special effects, video, audio, and a soundtrack.

The content signal generated by the media server may include metadata.

The method may also include retrieving, by the multicast network, one or more advertisements based on the metadata and queuing the retrieved advertisements for transmission by the multicast network with the multicast signal.

The multicast network may include a Wide Area Network (WAN) for multiplying the encrypted content signal to generate a multicast signal.

The encrypted unicast signals of the multicast signal may include identical packetized video signals.

The method may include storing the metadata by a database coupled to the media server, and wherein the metadata comprises live content production data.

The live content production data may include one or more of the following: title, duration, genre, film rating, cast, director, synopsis, budgets, costs, set buildouts, announcements, runtime, schedule, set configurations, technology loadouts, and scene workflows.

In another aspect, a method of mass distribution of independent live content may include accepting input of live content production proposal data by one or more user interfaces coupled to a media server, the media server operating a website displayed on the one or more user interfaces; storing live content production proposal data in a database coupled to the media server; providing notification to the one or more user interfaces that input of live content production proposal data is complete; displaying on the one or more user interfaces live content production proposal data; accepting input by the one or more user interfaces of review data for the live content production proposal data; storing review data for the live content production proposal data in the database; accepting input by the one or more user interfaces of live content production data; storing live content production data in the database; receiving live content comprising a real-time broadcast of a live performance by the media server; storing live content in the database; generating by the media server a content signal representative of the received live content production data and live content; encrypting, by a multicast network coupled to the media server, the content signal and multiplying the encrypted content signal to generate a multicast signal, the multicast signal comprising a plurality of encrypted unicast signals; transmitting, by the multicast network, the multicast signal via a data communication network to one or more receivers coupled to the multicast network via the data communication network.

The multicast network may include a Wide Area Network (WAN) for multiplying the encrypted content signal to generate a multicast signal.

Other objects and features will be in part apparent and in part pointed out hereinafter.

BRIEF DESCRIPTION OF THE DRAWINGS

These and other features, aspects, and advantages of the invention will be better understood from the following drawings, description, and appended claims, where:

Corresponding reference characters indicate corresponding parts throughout the drawings.

DETAILED DESCRIPTION

The following discussion describes in detail one embodiment of the invention and several variations of that embodiment. This discussion should not be construed; however, as limiting the invention to those particular embodiments. Practitioners skilled in the art will identify other embodiments as well. For a definition of the complete scope of the invention, the reader is directed to the appended claims.

This innovation provides a giant leap forward for independent content producers to mass distribute live content for theatrical release. This mass distribution system exclusively exhibits live content, including films, plays, music, comedy shows, and other related multimedia performances, that meet the aforementioned standards of an independent film. It substantially shortens the life cycle of production, reducing costs, and maximizing profit. Leveraging the aspects of the invention, live content can be announced as early as 180 days before it is exhibited theatrically versus an average of 871 days in the legacy Hollywood studio-monopolized distribution system. The system does not require post-production, further reducing the costs associated with the mass distribution of independent live content. The burden of content producers securing venues or locations to shoot, acquiring technology, and distributing their content is alleviated.

Figure 1:
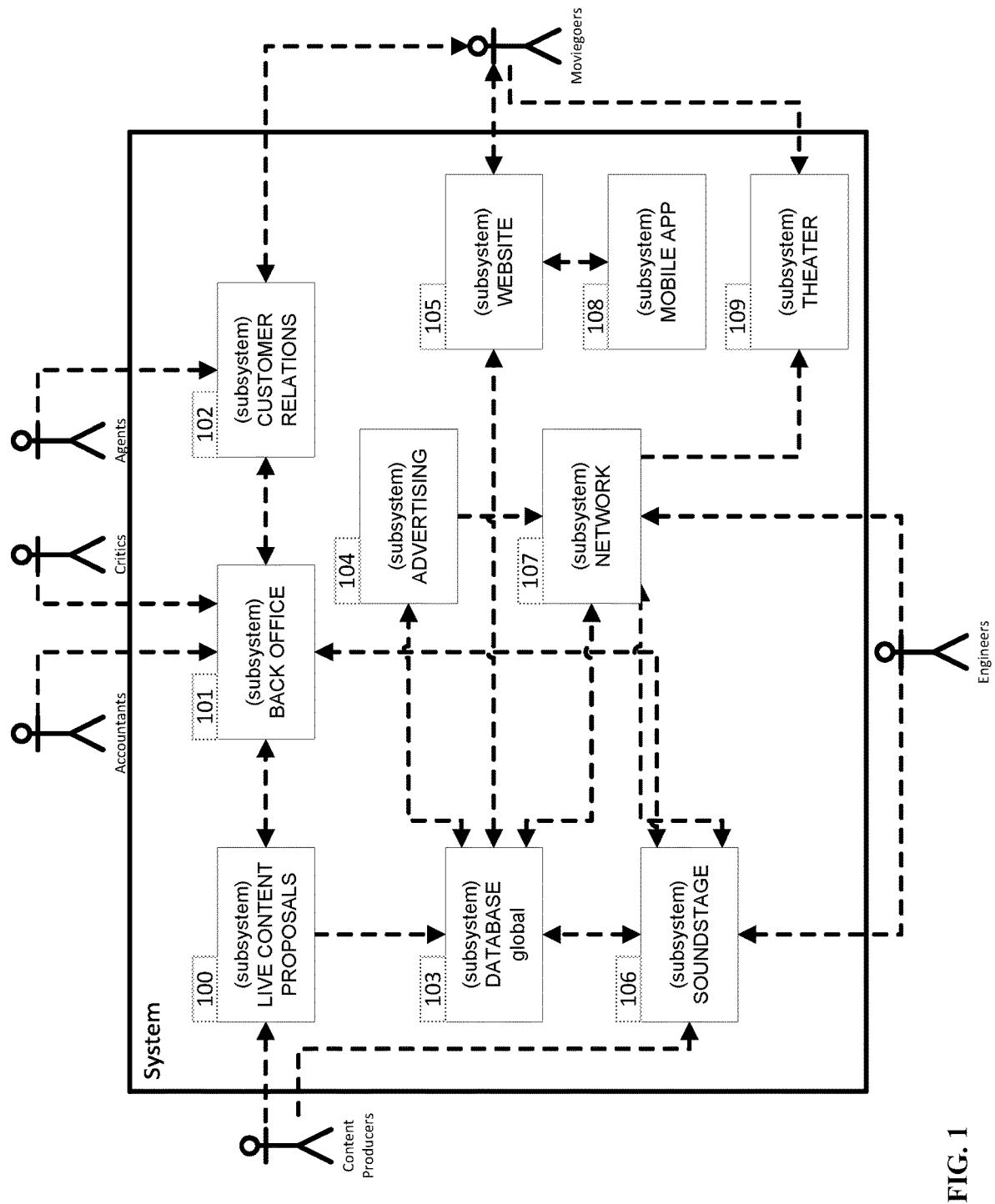
FIG. 1 is a diagrammatic illustration of a computerized submission, processing, and mass distribution system for independent live content according to an embodiment of the present invention.

FIG. 1 is a diagrammatic illustration of a computerized submission, processing, and mass distribution system for live independent content according to an embodiment of the present invention. A major advantage of aspects of the invention is the Content Producer is not required to have post-production expenses or a Print and Advertising (P&A) budget. Another advantage of aspects of the invention is offering Zero Cost Distribution compared to traditional film distribution of which the average US Distributor commission is 30% (Follows, 2014). Submissions for Live Content Production Proposals are hosted on a server 103. Although Live Content Production Proposals are created by Content Producers, Accountants, Critics, and Agents use the Back Office 101 to provide services related to the evaluation, clarification, and approval, or rejection of the Live Content Production Proposal. If a Live Content Production Proposal is approved, it becomes the framework for Content Producers to build a Live Content Production, which means the data record is sustained in the Database 103 throughout the life cycle of the Live Content Production. Agents use the Customer Relations Management subsystem 102 to sell tickets, provide customer service, and sell advertisements, which are created in the Advertising subsystem 104, and then attached to the Live Content Production inside the Network 107 to be distributed to Theaters 109. When a Live Content Production is created, it is forwarded to the Soundstage 106 where Content Producers attach artifacts beyond the basic schedule and Live Content profile, including but not limited to set configurations, technology loadouts, scene workflows, and other artifacts required to produce the Live Content Production. Moviegoers interact with the system via the Website 105 and Mobile Application 108 to purchase tickets, communicate with other users and staff, and purchase advertisements. During runtime, the Network 107 multicasts Live Content, including Advertisements, to one or more Theater(s) 109 which is then simulcast to one or more internal entertainment pods for exhibition to moviegoers.

Figure 2:
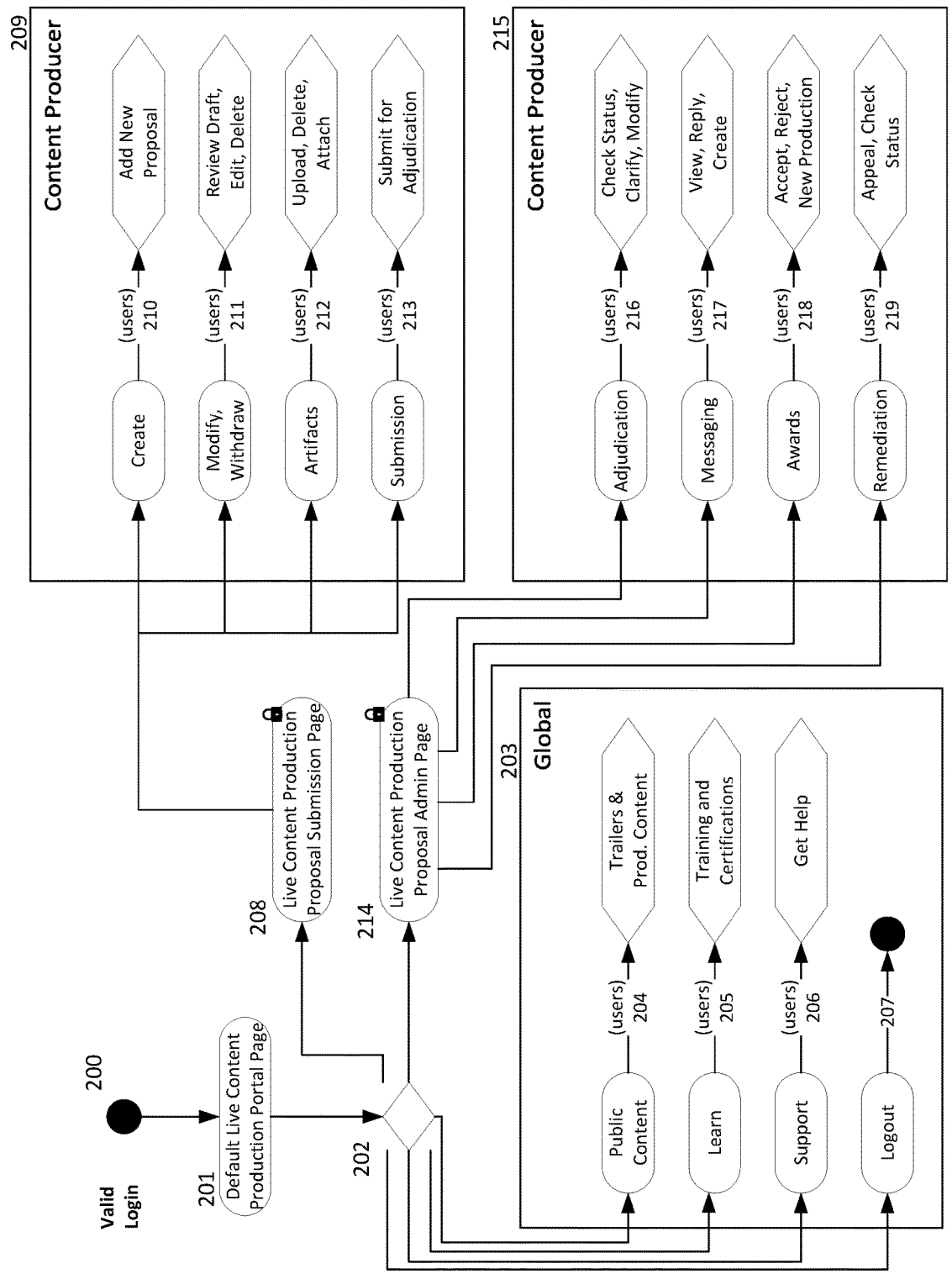
FIG. 2 is a diagram that illustrates an example of a submission from the operational perspective of the content producer, which is performed by a user, accessing the Live Content Production Portal of the Website shown in FIG. 1 via a computer internet web browser.

FIG. 2 is a diagram that illustrates an example of a Live Content Production Proposal submission from the operational perspective of the content producer, which is performed by a user, accessing the Live Content Production Portal of Website shown in FIG. 1 via a computer internet web browser. In an embodiment, any Content Producer may use the system's website to submit a Live Content Production Proposal via the secure Live Content Production Portal 201. A global area of the website 203 offers access to public content 204, learning tools 205, support 206, and the ability to log out 207 of the secure portal. The Live Content Production Proposal Submission Page 208 allows Live Content Producers to create new Live Content Production Proposals 210, review, share, modify, or withdraw them 211, attach required and optional artifacts, including but not limited to supporting documents, budgets, and proposed schedules. 212, and submit the proposal to the distributor 213 for adjudication. Once submitted, the Live Content Proposal can be managed via the Live Content Production Proposal Admin Page 214 where Live Content Producers interact with Accountants, Agents, and Critics (Adjudicators) 216 to check the status of the proposal, provide clarification, or even modify it based on feedback from the Adjudicators. This interaction takes place via secure messaging 217 which provides alerts for changes in status and the ability to send and receive direct private or group messages to the adjudicators. Live Content Producers are notified of Awards via the secure messaging feature of the system and can reject the award offer or accept it and convert the Live Content Production Proposal into a new Live Content Production 218 which is automatically forwarded to the Soundstage as shown in FIG. 1. If the Live Content Proposal is rejected, the Live Content Producer may request Remediation 219, an opportunity to appeal the committee's decision and request another adjudication.

Figure 3:
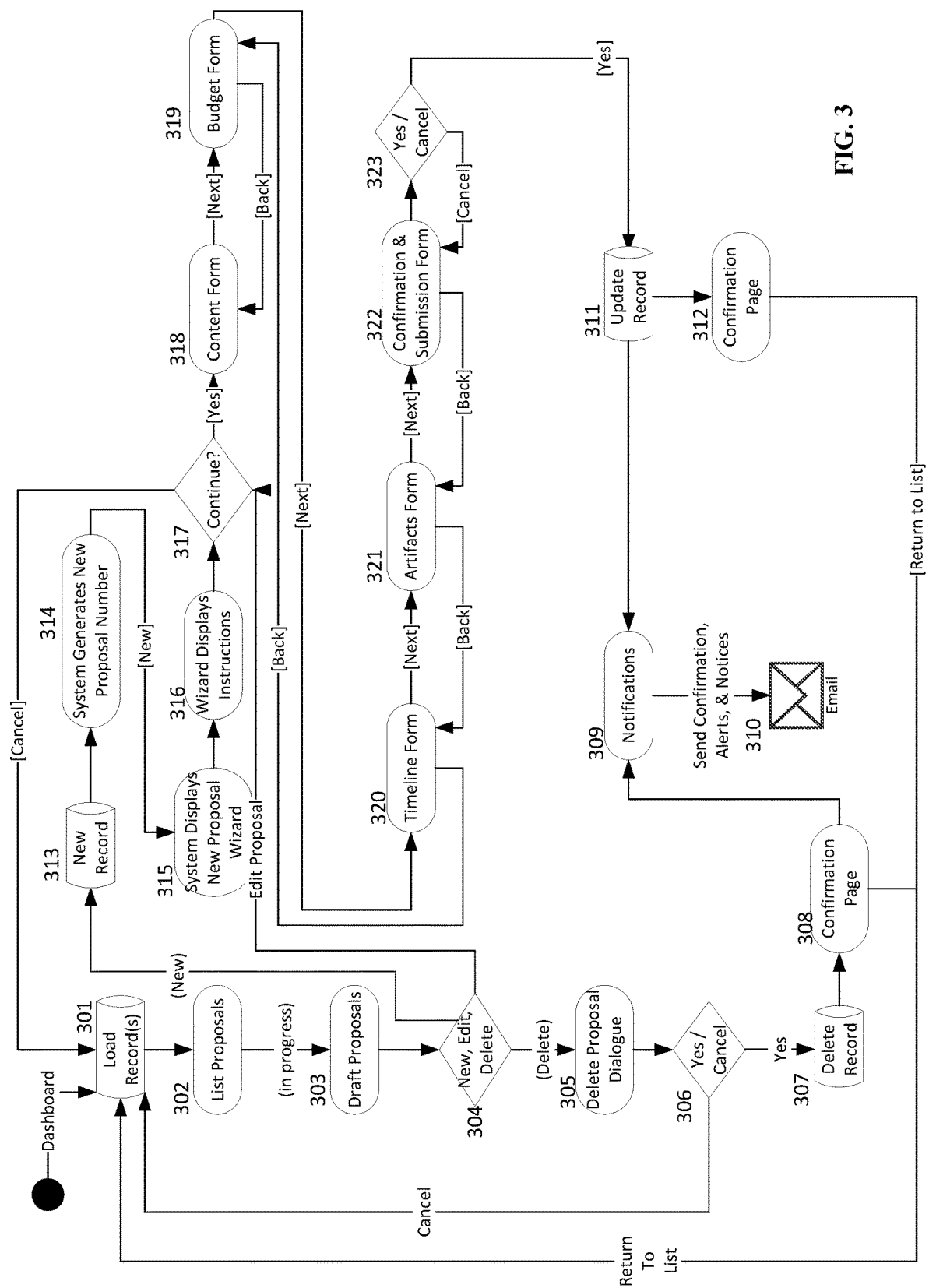
FIG. 3 is a flowchart that illustrates the steps performed by a Live Content Producer to submit a Live Content Production Proposal according to the embodiment of the invention shown in FIG. 2.

FIG. 3 is a flowchart that illustrates the steps performed by a Live Content Producer to submit a Live Content Production Proposal according to the embodiment of the invention shown in FIG. 2. The Live Content Production Proposal dashboard provides a list 302 of draft proposals 303—if any—for users to edit or delete. It also offers users the ability to create a new proposal using the New Proposal Wizard 315. The Content Form 318 is used to build a Live Content Profile which contains information, including but not limited to the title of the Live Content, duration, genre, proposed film rating (G, PG, PG-13, R), cast, director(s), a detailed synopsis, and other relevant information for the purpose of adjudication. The Budget Form 319 is used to provide the distributor's accountants with the costs to produce the Live Content, including but not limited to general expenses, set buildouts, and announcements. The Timeline Form 320 includes details including the proposed runtime, duration, and schedule for the Live Content Production. The Artifacts Form 321 allows users to upload required and optional supporting documentation for the adjudication process. Finally, the Confirmation and Submission Form 322 allows users to review the entire proposal and submit it to the distributor for adjudication. Once submitted, all required parties are notified 309 via email 310, and the user is provided a Confirmation Page 312. Users can manage existing proposals from the dashboard as well, editing, or withdrawing by deleting them. If a user opts to delete a proposal, the users is presented the Delete Proposal Dialogue 305. If deletion is confirmed, then the data record is marked for deletion via a delete flag and the user is presented a Confirmation Page 308. If a user opts to edit an existing proposal, the option to continue or cancel 317 is presented to the user. If the user chooses to continue, the Proposal Number is used to find the record in the database, and the user is taken to the Content Form 318 and all forms in the Proposal Wizard 315 are populated in "edit mode." Once any action has been performed successfully, users are returned to the List of Proposals 302 in the dashboard, which is updated to reflect any changes.

Figure 4:
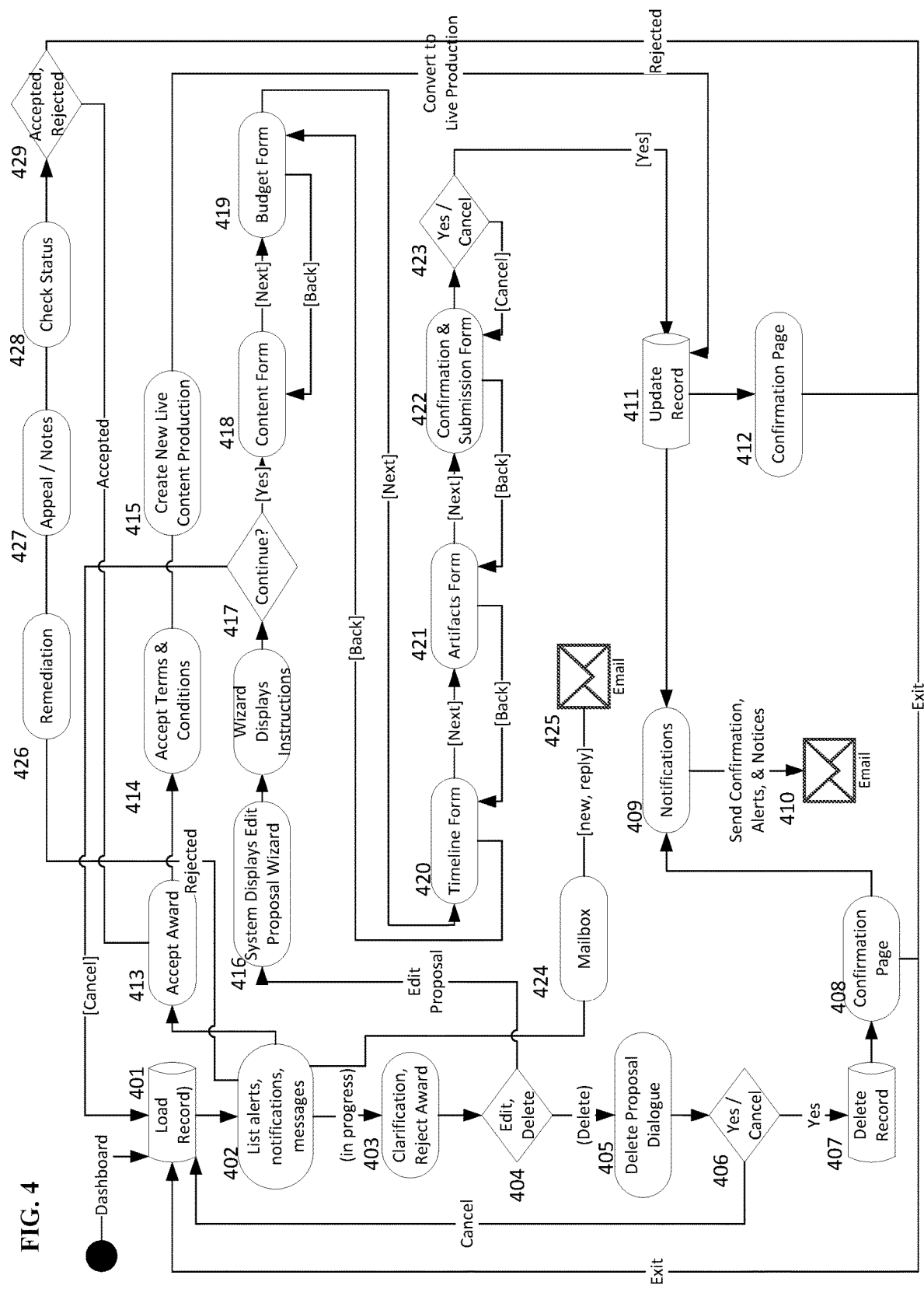
FIG. 4 is a flowchart that illustrates the steps performed by a Live Content Producer to manage a Live Content Production Proposal for adjudication.

FIG. 4 is a flowchart that illustrates the steps performed by a Live Content Producer to manage a Live Content Production Proposal for adjudication. Only a proposal that is currently under review will appear in this part of the portal. The record is loaded 401 and a list of alerts, notifications, and messages are shown to the user 402. The user may at their discretion withdraw the active proposal by clicking delete 404. The proposal will be marked for deletion and the users will be returned to the dashboard where a new proposal can be created, or other existing proposals can be edited. If a reviewer (accountant, critic, sales agent, or engineer) requests clarification, the Content Proposer may edit the proposal 416 and is given the opportunity to make edits to any part of the Live Content Production Proposal via the Live Content Production Proposal wizard according to the embodiment of the invention in FIG. 3. Once clarification edits have been completed 422, the proposal record is saved, and notifications are sent to all required parties for a response. If the Live Content Production Proposal is rejected, the Content Producer may request remediation 426, which involves appealing the decision of the Content Committee. The Content Producer may use this portion of the portal to check the status of the appeal. If the appeal is accepted, an award offer will be made and the Content Producer will have the opportunity to accept the award 413, agree to the terms and conditions 414, and create a new Live Content Production, which will be forwarded to the Soundstage for Announcement according to the embodiment of the invention in FIG. 1.

Figure 5:
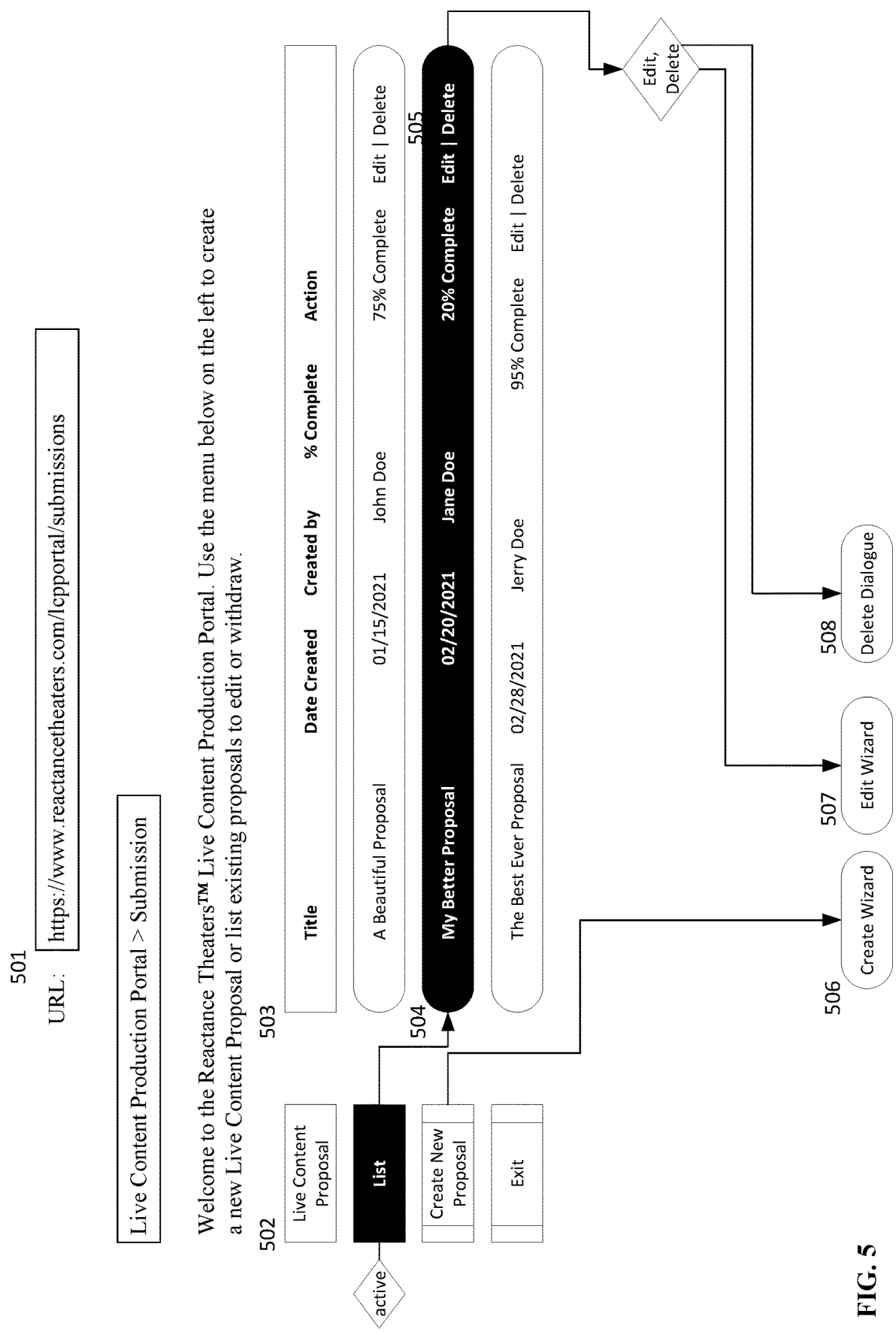
FIG. 5 is an illustration showing an example of a user interface of a computer according to the embodiment of the invention shown in FIG. 3.

FIG. 5 is an illustration showing an example of a user interface of a computer according to the embodiment of the invention shown in FIG. 3. A sample URL 501 for this web page is shown at the top of the illustration. Users are presented a menu on the left 502 to create a new proposal (the Create Wizard 506 will be displayed), list existing proposals, or exit this area of the dashboard. Upon activating the List menu item, a list of existing proposals 503 will appear to the right of the menu, and limited identifying information, including title and creator will be displayed for each list item. Once an item is activated 504, the Edit and Delete options will be enabled 505. If the user opts to delete a proposal, the user will be presented the Delete Dialogue 508. If a user opts to edit a proposal, the Edit Wizard 507 will be displayed.

Figure 6:
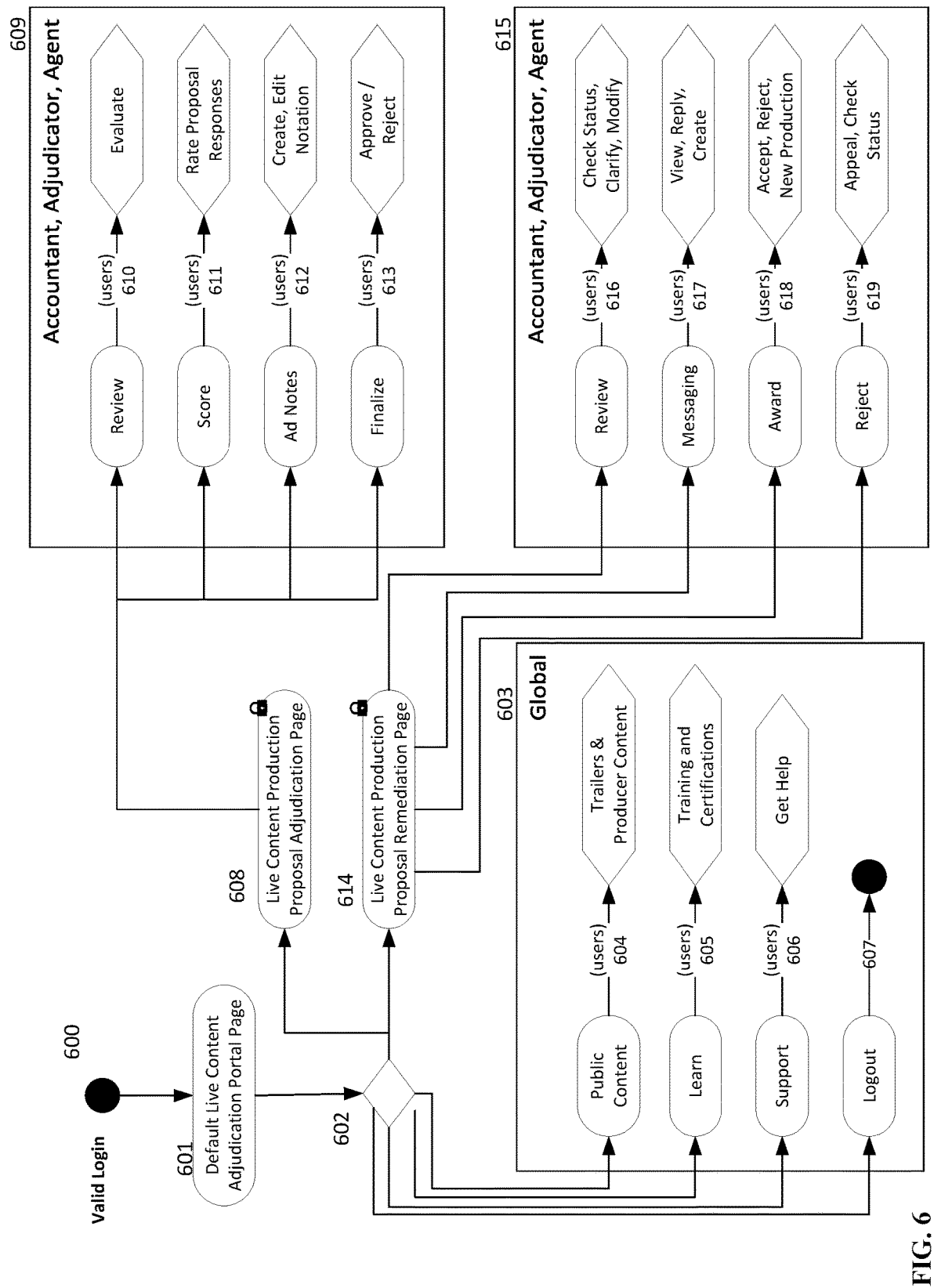
FIG. 6 is a diagram that illustrates an example of processing a new Live Content Production Proposal from the operational perspective of the Distributor, performed by computer(s) and one or more users according to the embodiment of the invention shown in FIG. 1.

FIG. 6 is a diagram that illustrates an example of processing a new Live Content Production Proposal from the operational perspective of the Distributor, performed by computer(s) and one or more Distributor users according to the embodiment of the invention shown in FIG. 1. In an embodiment, any Distributor user may use the system's website to adjudicate a Live Content Production Proposal via the secure Live Content Adjudication Portal 601. A global area of the website 603 offers access to public content 604, learning tools 605, support 606, and the ability to log out 607 of the secure portal. Users pull pending proposals that require adjudication 608 and review 610 all proposal content, notes, budget, proposed timelines, and artifacts to evaluate the suitability of the Live Content Production proposed. The review committee is made up of adjudicators—accountants, sales agents, critics, and engineers—who each review the Live Content Production Proposal and assign a score 621 to each section, subsection, and artifact. These adjudicators must add notes 612 in the system to justify their final determination. Adjudicators' final determination is recorded 613 as an approval or rejection. The score of the Live Content Production Proposal is not mutually exclusive to its approval or rejection. A Live Content Production Proposal may receive a high overall score, but still be rejected for violation of suitability standards or, for example, as a result of a proposed rating that is inadequate based on the proposed content. Once finalized by the last adjudicator, a Live Content Production Proposal's final score and determination is calculated. Scores are calculated as a weighted average for each Live Content proposal section while the final determination is calculated as a two-thirds majority vote. A minimum of three users must pull a proposal before it can be adjudicated and finalized.

Figure 7:
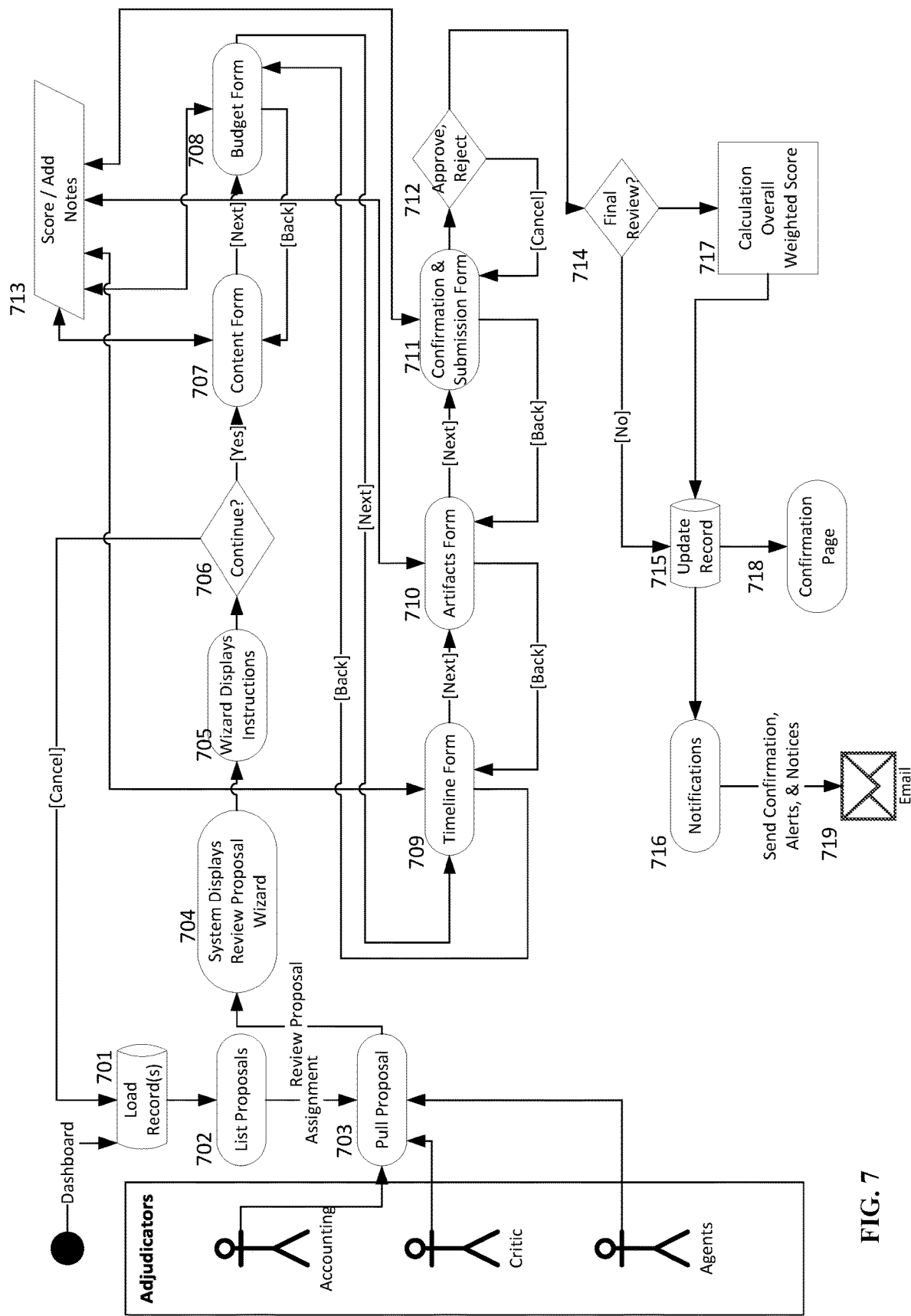
FIG. 7 is a flowchart that illustrates the sequence of steps performed by a computer and the Distributor upon receipt of a new Live Content Production Proposal from a Live Content Producer according to the embodiment of the invention shown in FIG. 5.

FIG. 7 is a flowchart that illustrates the sequence of steps performed by a computer and the Distributor upon receipt of a new Live Content Production Proposal from a Live Content Producer according to the embodiment of the invention shown in FIG. 5. From the dashboard, users access proposals via a pull system 703 which allows an accountant, critic, engineer, or agent to self-assign a Live Content Production Proposal to them to perform adjudication activities. Once assigned to a Live Content Production Proposal, the system displays the same wizard 704 the Content Producer used to submit the Live Content Production Proposal. The wizard has administrative features enabled for adjudicators, which allows users to review the content of each wizard form, append notes, and apply a score 713 to each section or subsection. Once all sections have been reviewed, annotated, and scored, the user must approve or reject 712 the Live Content Proposal. If the user is the final reviewer 714 for the Live Content Proposal, then the overall weighted score is calculated 717 along with the final determination, which requires a two-thirds majority vote. For example, if there is a total of three reviewers, two of three reviewers must vote to approve the Live Content Production Proposal for an award to be generated and submitted to the Content Producer for acceptance. Each reviewer, once the review is complete, is presented with a confirmation page 718 after the Live Content Proposal record is updated with all notes, scores, and votes. Then, notifications 716 are sent via email 719 to the Content Producer.

Figure 8:
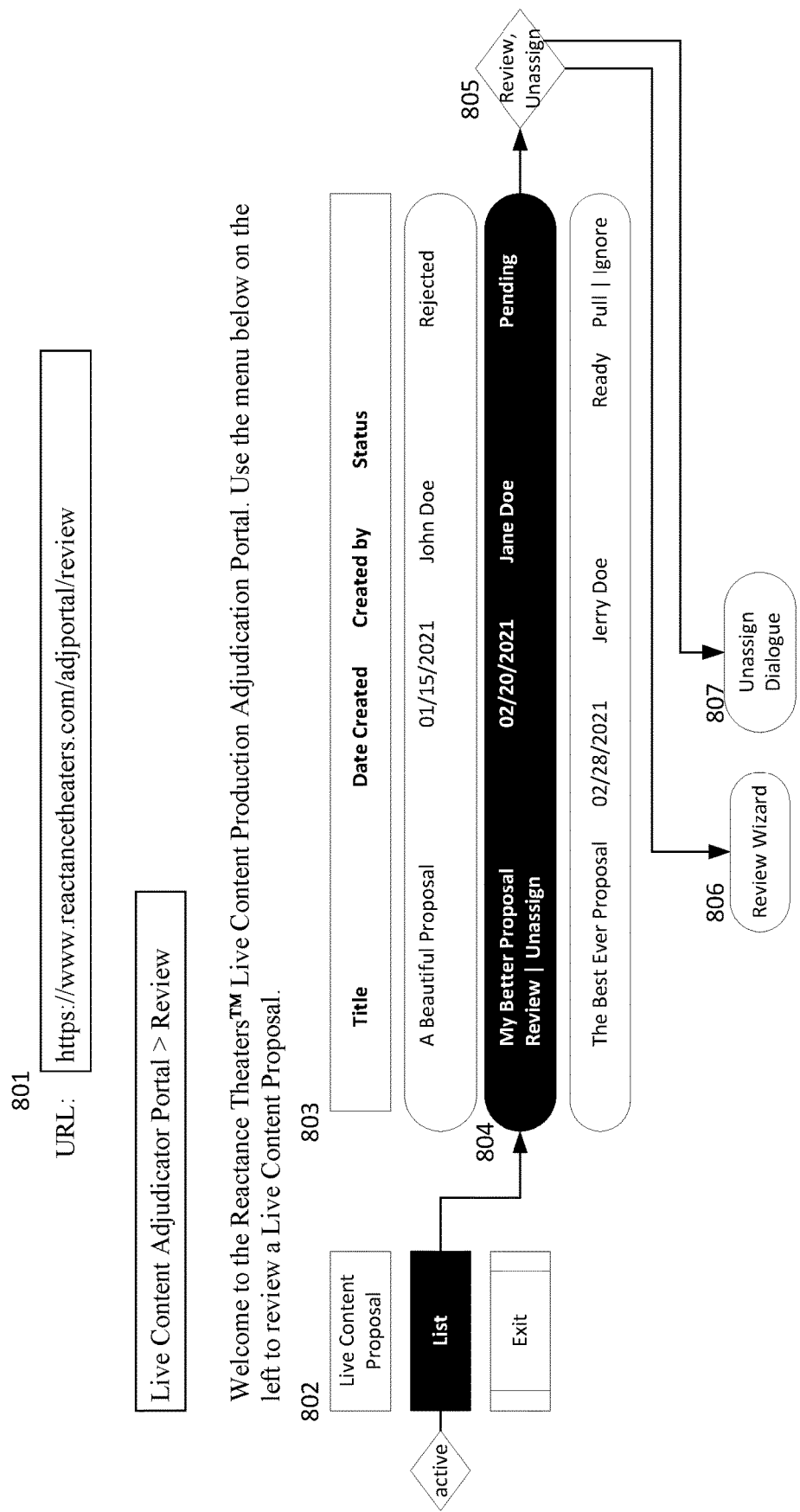
FIG. 8 is an illustration showing the user interface of a computer according to the embodiment of the invention shown in FIG. 6.

FIG. 8 is an illustration showing the user interface of a computer according to the embodiment of the invention shown in FIG. 6. A sample URL 801 for this web page is shown at the top of the illustration. Users are presented a menu on the left 802 to list existing proposals or exit this area of the dashboard. Upon activating the List menu item, a list of existing proposals 803 will appear to the right of the menu, and limited identifying information, including title and creator, will be displayed for each list item. Once an item is activated 804, if the user has not pulled the Live Content Production Proposal yet, the Pull and Ignore options will be enabled 805. Otherwise, if the user has already pulled the Live Content Proposal and is actively an adjudicator, then the Review and Unassign options will be enabled. If the user opts to remove themselves as an adjudicator from a proposal, the user will be presented the Unassign Dialogue 807. If a user opts to review a proposal, the Review Wizard 806 will be displayed.

Figure 9:
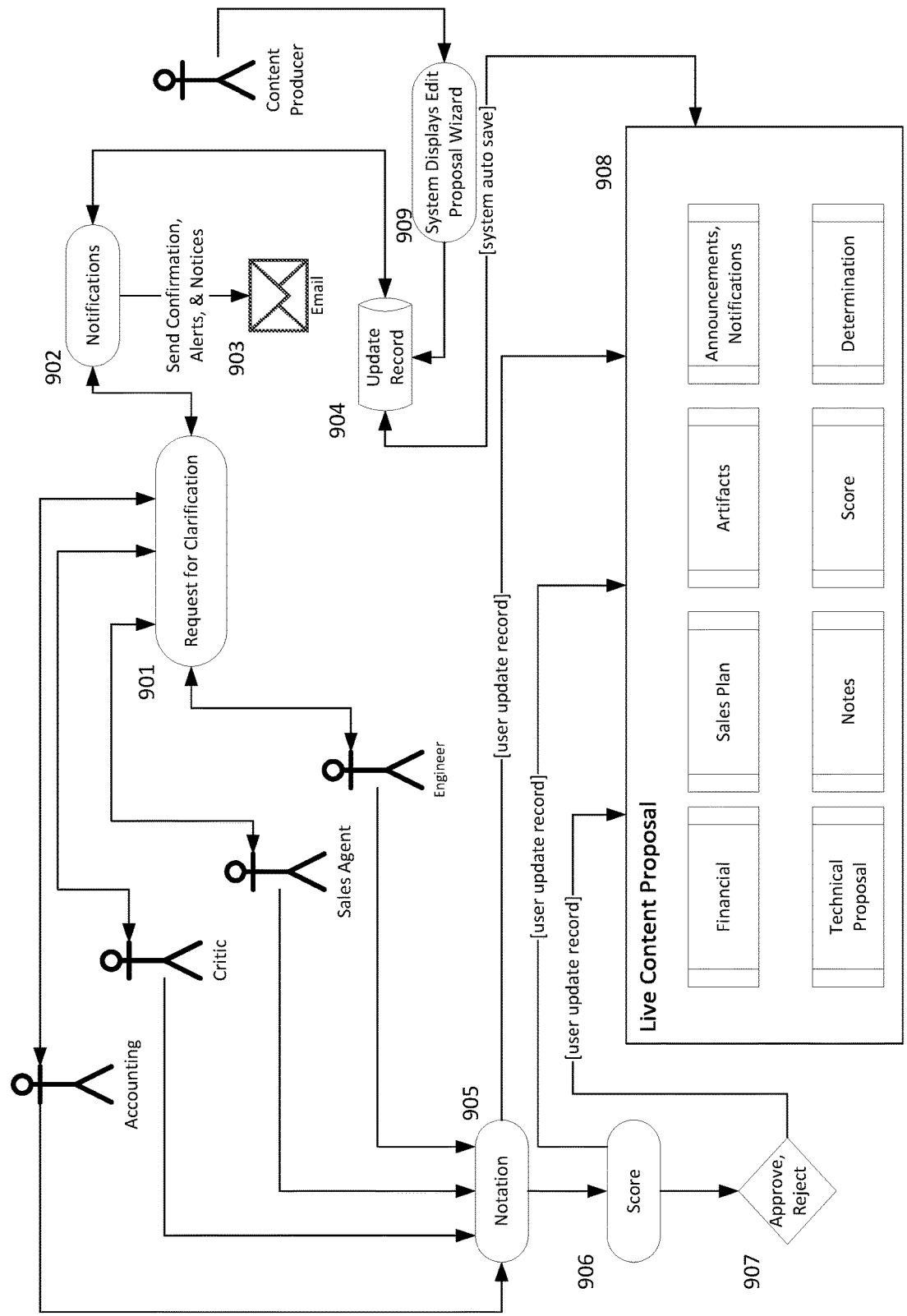
FIG. 9 is a flowchart that illustrates the sequence of steps performed by a Content Producer, a Distributor user, and a computer system to process the Live Content Proposal and perform notifications, requests for clarification, adjudication, and remediation of the Live Content Proposal according to the embodiment of the invention as shown in FIG. 7.

FIG. 9 is a flowchart that illustrates the sequence of steps performed by a Content Producer, a Distributor user, and a computer system to process the Live Content Production Proposal and perform notifications, requests for clarification, adjudication, and remediation of the Live Content Production Proposal according to the embodiment of the invention as shown in FIG. 7. Accountants, critics who are trained specifically to evaluate the suitability of Live Content and may have film, music, entertainment, or other relevant criticism experience, sales agents, and engineers together form the Review Committee for adjudication. Each user reviews the Live Content Production Proposal from their unique perspectives, adding notes 905, scoring 906 sections and subsections, and voting to approve or reject the Live Content Production Proposal 907. All annotations, scores, and votes are appended to the Live Content Production Proposal record 904 in the global database according to an embodiment of the present invention. Users may request clarification 901 and the Content Producer is sent alerts, notifications, and notices via email 903. In response to requests for clarification, the Content Producer must update the Live Content Production Proposal via the Edit Wizard 909, making required changes, or adding notes for adjudicators. Once the Content Producer makes changes to the Live Content Production Proposal, the record is updated 904 and the adjudicators are notified 902 to continue their review. Once all reviews are complete, the system performs tasks to finalize the Live Content Production Proposal 908.

Figure 10:
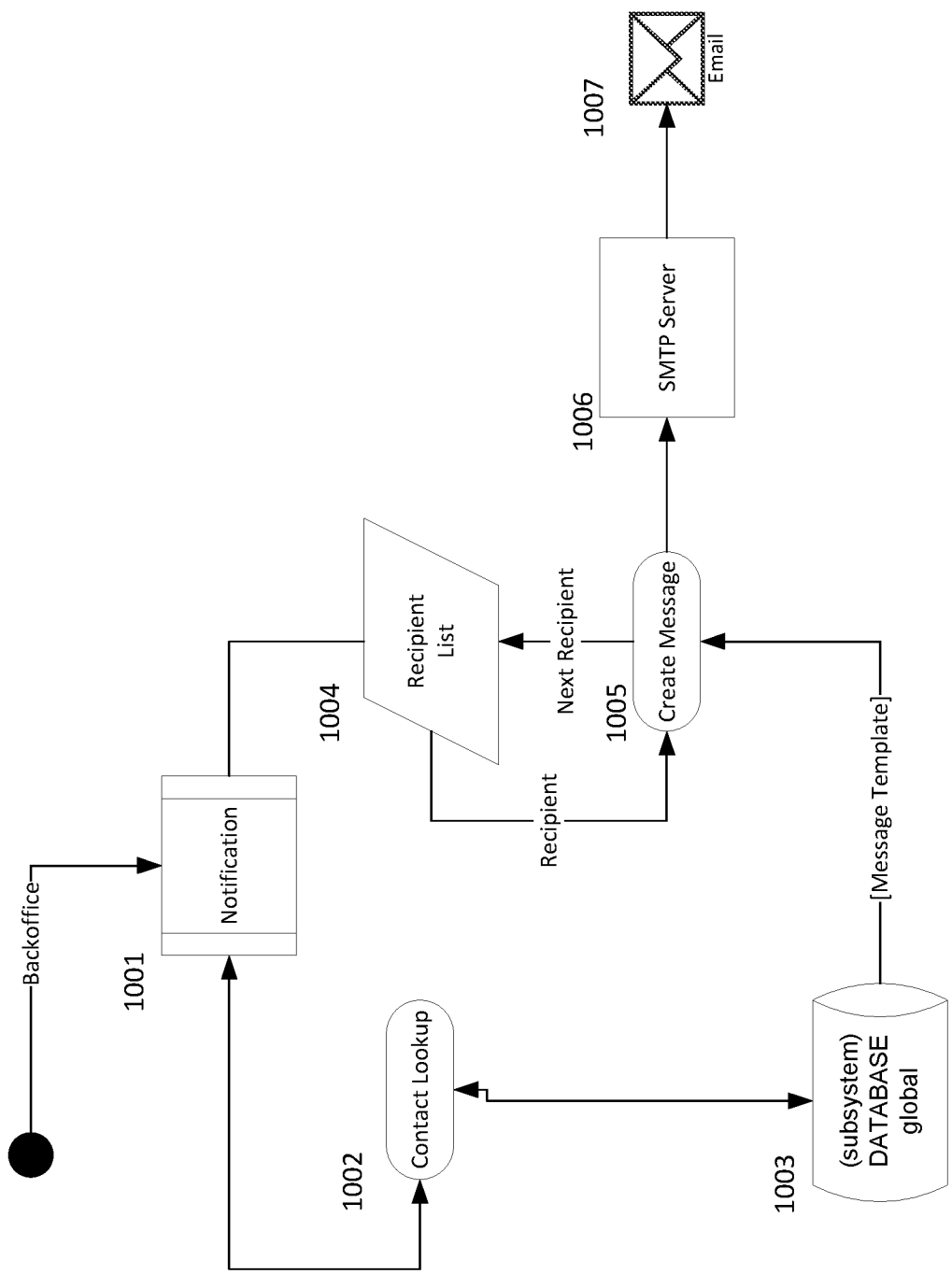
FIG. 10 is a flowchart illustrating the sequence of steps performed by a computer to administer notifications according to the embodiment of the invention shown in FIG. 9.

FIG. 10 is a flowchart illustrating the sequence of steps performed by a computer to administer notifications according to the embodiment of the invention shown in FIG. 9. When notifications 1001 are generated in the Backoffice, the system performs a contact lookup 1002 in the global database 1003 and builds a notifications recipient list 1004. The list contains metadata that provides information on the type of message and the content of the message to be generated. The system generates a message 1005 based on this metadata and submits it to an SMTP server 1006 to be emailed 1007 to the recipient. This loop continues until all messages are properly generated and the entire recipient list has been processed.

Figure 11:
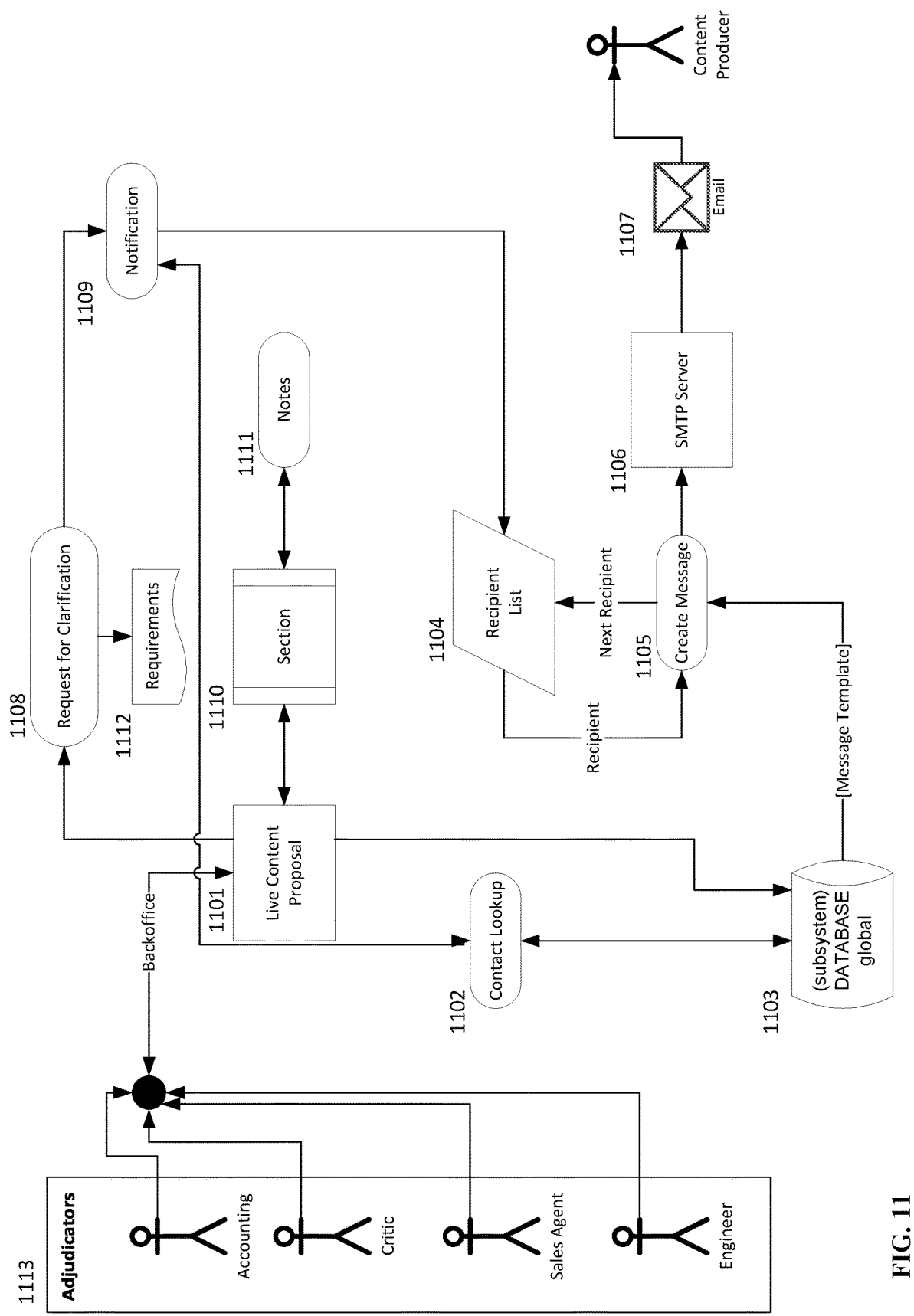
FIG. 11 is a flowchart illustrating the sequence of steps performed by Distributor user(s) to request clarification from the Content Producer according to the embodiment of the invention shown in FIG. 9.

FIG. 11 is a flowchart illustrating the sequence of steps performed by Distributor user(s) to request clarification from the Content Producer according to the embodiment of the invention shown in FIG. 9. Adjudicators 1113 must review each section 1110 of the Live Content Production Proposal 1101 via the Backoffice area of the system. The adjudicator is required to add notes to each section and may, at their discretion, initiate a request for clarification 1108. Once a request for clarification 1108 has been initiated and the requirements 1112 have been appended to the request, notification 1109 is sent to the Content Producer. The Live Content Proposal remains in Pending status.

Figure 12:
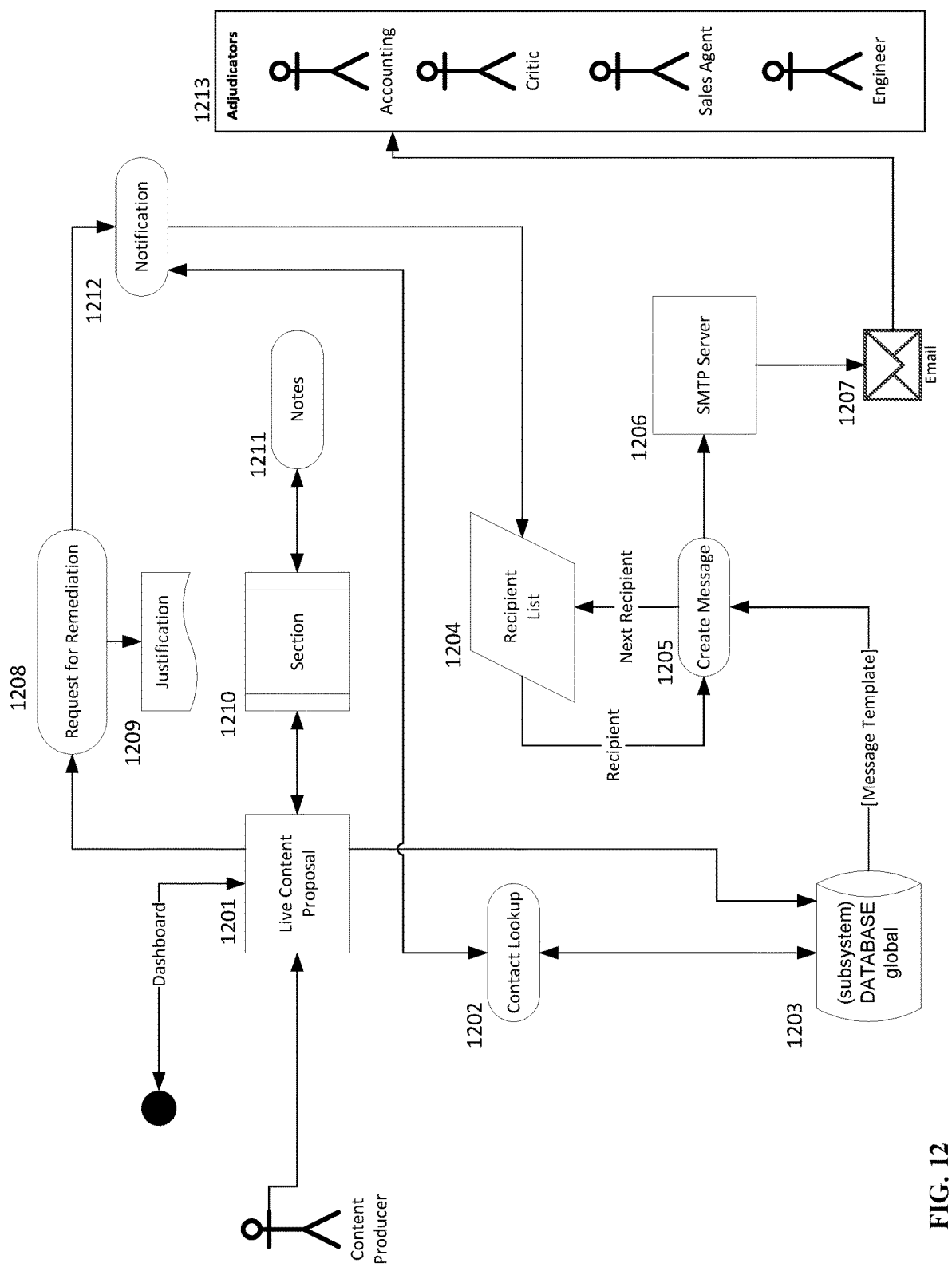
FIG. 12 is a flowchart illustrating the sequence of steps performed by a Content Producer to submit a request for remediation and a Distributor user to process the request according to the embodiment of the invention shown in FIG. 9.

FIG. 12 is a flowchart illustrating the sequence of steps performed by a Content Producer to submit a request for remediation according to the embodiment of the invention shown in FIG. 9. Having been notified that their Live Content Production Proposal has been rejected, a Content Producer may request remediation 1208 via the dashboard. The Content Producer must review the Live Content Production Proposal 1201, including all sections 1210, notes 1211, scores, and final determinations made by the Adjudicators 1213 and determine if the defects indicated by the Adjudicators can be remedied. For example, if a Live Content Production Proposal timeline conflicts with an existing, approved Live Content Production, Adjudicators may have rejected the proposal even if they assigned an overall high score. In this case, the Content Producer would adjust the proposed timeline via the edit wizard, append a justification to the Request for Remediation. Once finalized, the Request for Remediation is saved in the database 1203, and notification 1212 is sent to the Adjudicators 1213. The Live Content Proposal goes from Complete status back to Pending status.

Figure 13:
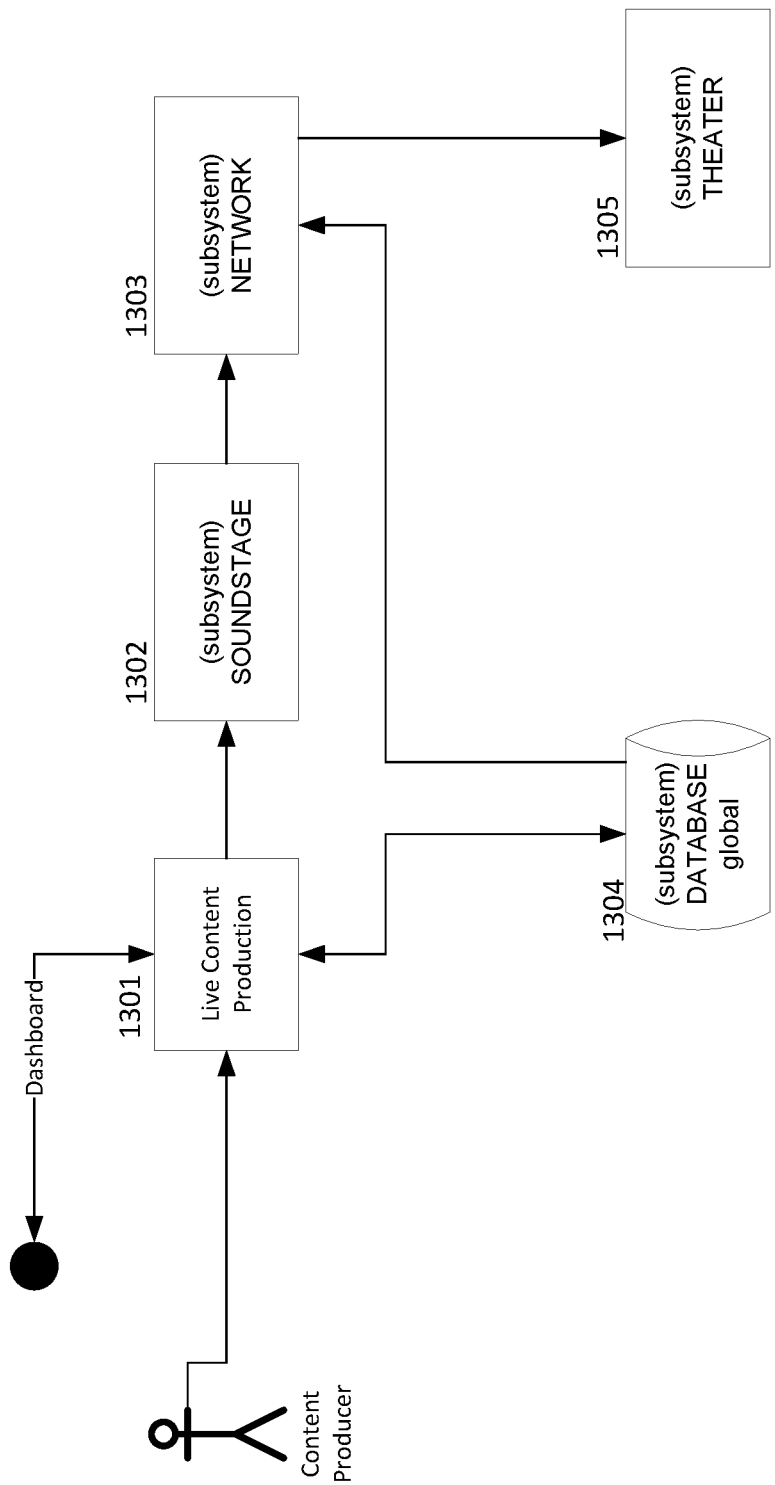
FIG. 13 is a diagrammatic illustration of a computerized Live Content Production Network workflow according to an embodiment of the present invention.

FIG. 13 is a diagrammatic illustration of a computerized Live Content Production Network workflow according to an embodiment of the present invention. Content Producers build a Live Content Production by storing artifacts in the global database 1304 and using the Soundstage 1302 which broadcasts a Live Content Production via the network 1303, a complex computerized system that scales the Live Content Production and multicasts it, using the public internet, to endpoints in multiple theaters 1305.

Figure 14:
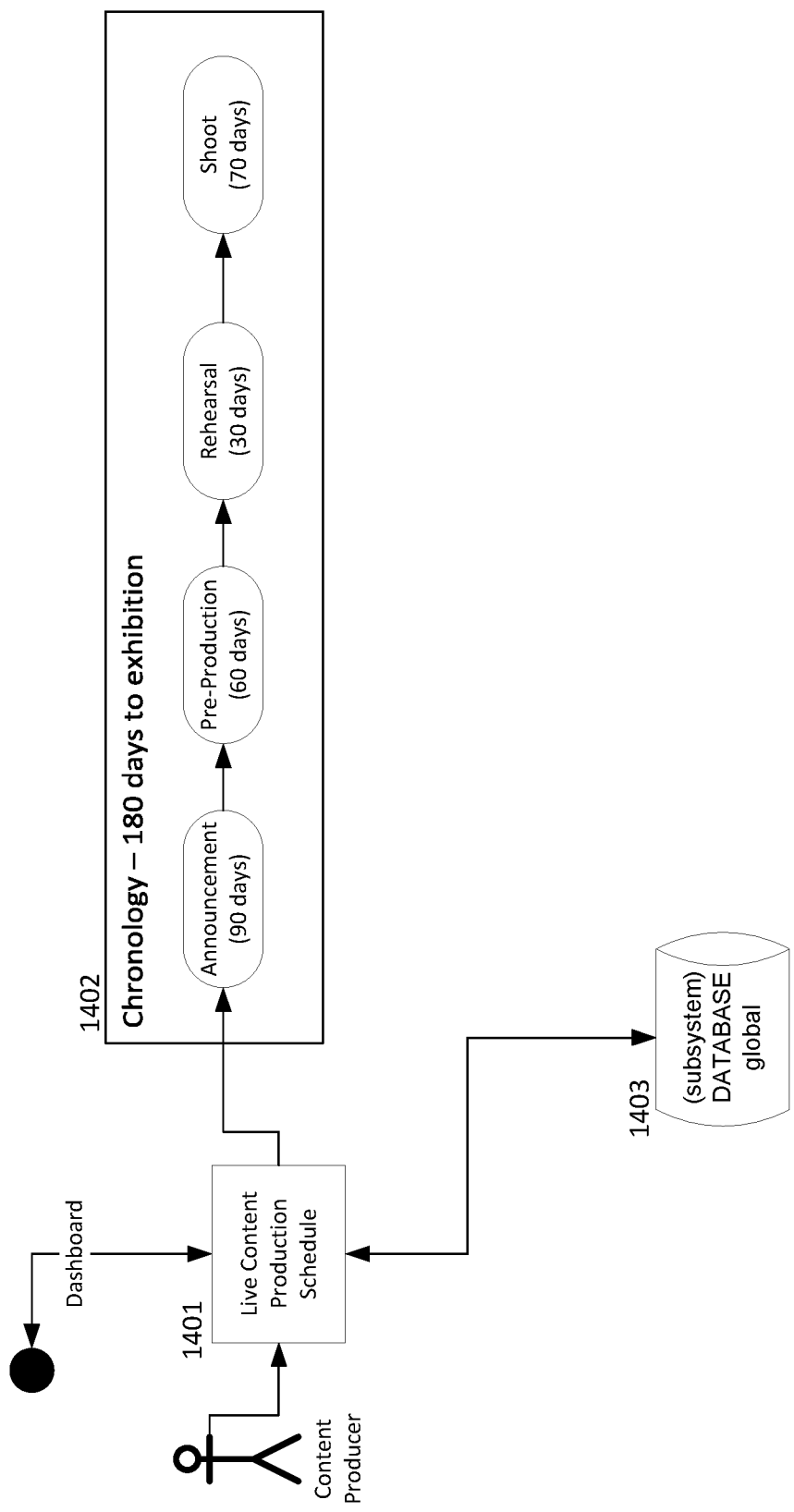
FIG. 14 is a diagrammatic illustration of a computerized Live Content Production Schedule according to the embodiment of the invention shown in FIG. 13.

FIG. 14 is a diagrammatic illustration of a computerized Live Content Production Schedule according to the embodiment of the invention shown in FIG. 13. The live Content Production Schedule 1401 coordinates all aspects of a Live Content Production, including its chronology 1402, when it is announced to the public, the duration of pre-production and rehearsal, and the duration of the shoot. Elements of the Live Content Production Schedule 1401, including Live Content Production runtime, scene timing, and set transition are stored in the global database 1403. The Live Content Production Schedule is negotiated during the Live Content Production Proposal phase between the Content Producer and the adjudicators. It must also include adequate time for engineers to configure the soundstage for the live performance. The average traditional film production between 2006 and 2019 was announced 871 days before it was eventually in theaters. Pre-production took 146 days, principal photography took 106 days, and post-production began 301 days before the movie was exhibited. An embodiment of the invention is designed to substantially shorten the life cycle of production, reducing costs, and maximizing profit. Live Content can be announced only 180 days before it is exhibited in theaters and monetized from the first day of exhibition until the last day. Content Producers who use aspects of the invention to produce Live Content Productions make money before traditional films go into pre-production. With a shorter announcement and no post-production required, filmmakers spend less producing Live Content via aspects of the invention.

Figure 15:
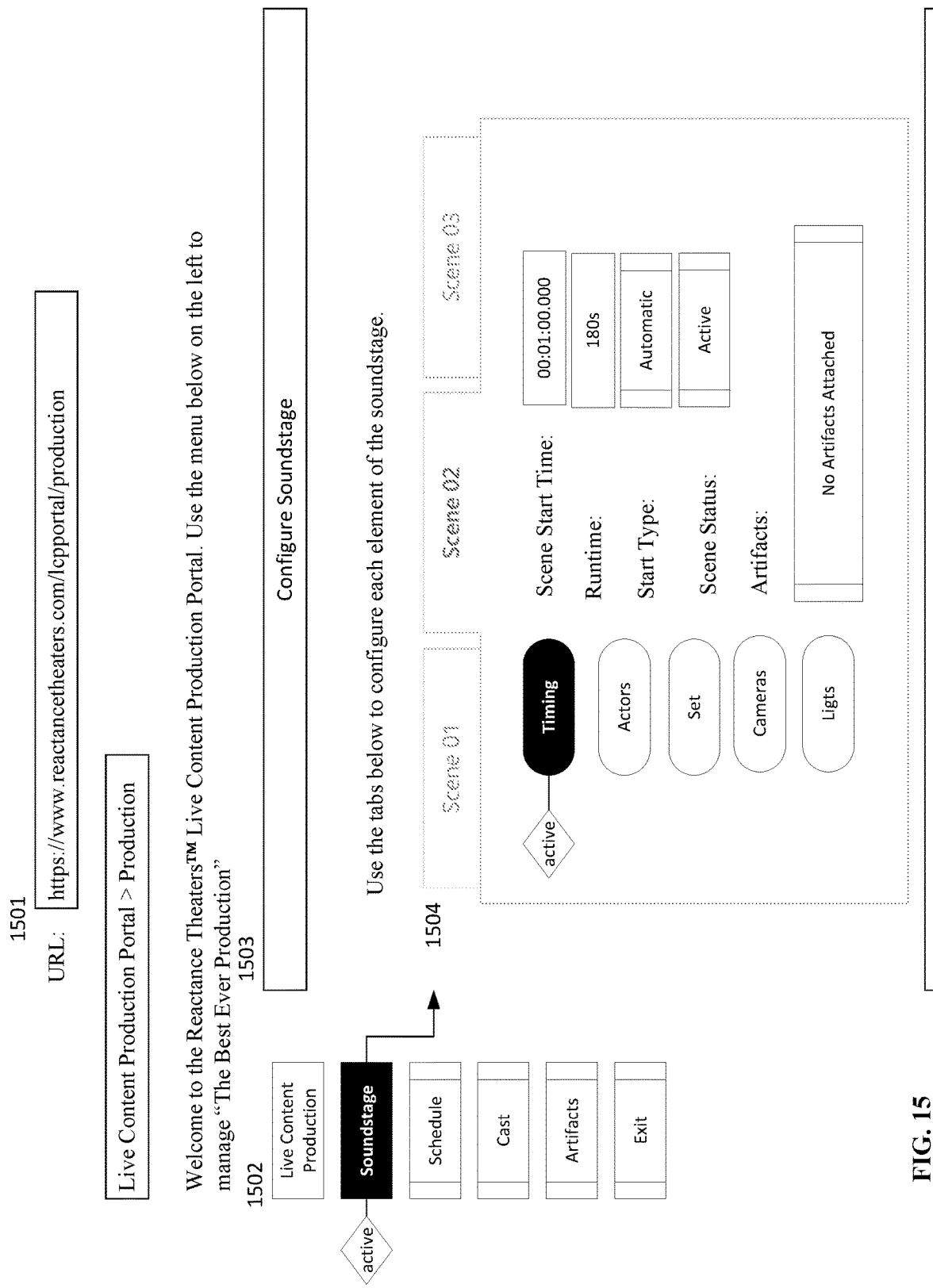
FIG. 15 is an illustration showing an example of a user interface of a computer according to the embodiment of the invention shown in FIG. 13.

FIG. 15 is an illustration showing an example of a user interface of a computer according to the embodiment of the invention shown in FIG. 13. The Live Content Production Portal allows Content Producers to access all aspects of the Live Content Production. A sample URL 1501 for this web page is shown at the top of the illustration. Users are presented a menu on the left 1502 to configure the Soundstage as shown in the sample screen 1503 of the selected submenu item and the tab-driven wizard 1504 which, in this example, configures the elements of the soundstage by scene. Content Producers can use this portal to manage the schedule, cast, and upload artifacts which may be attached to any component of the Live Content Production.

Figure 16:
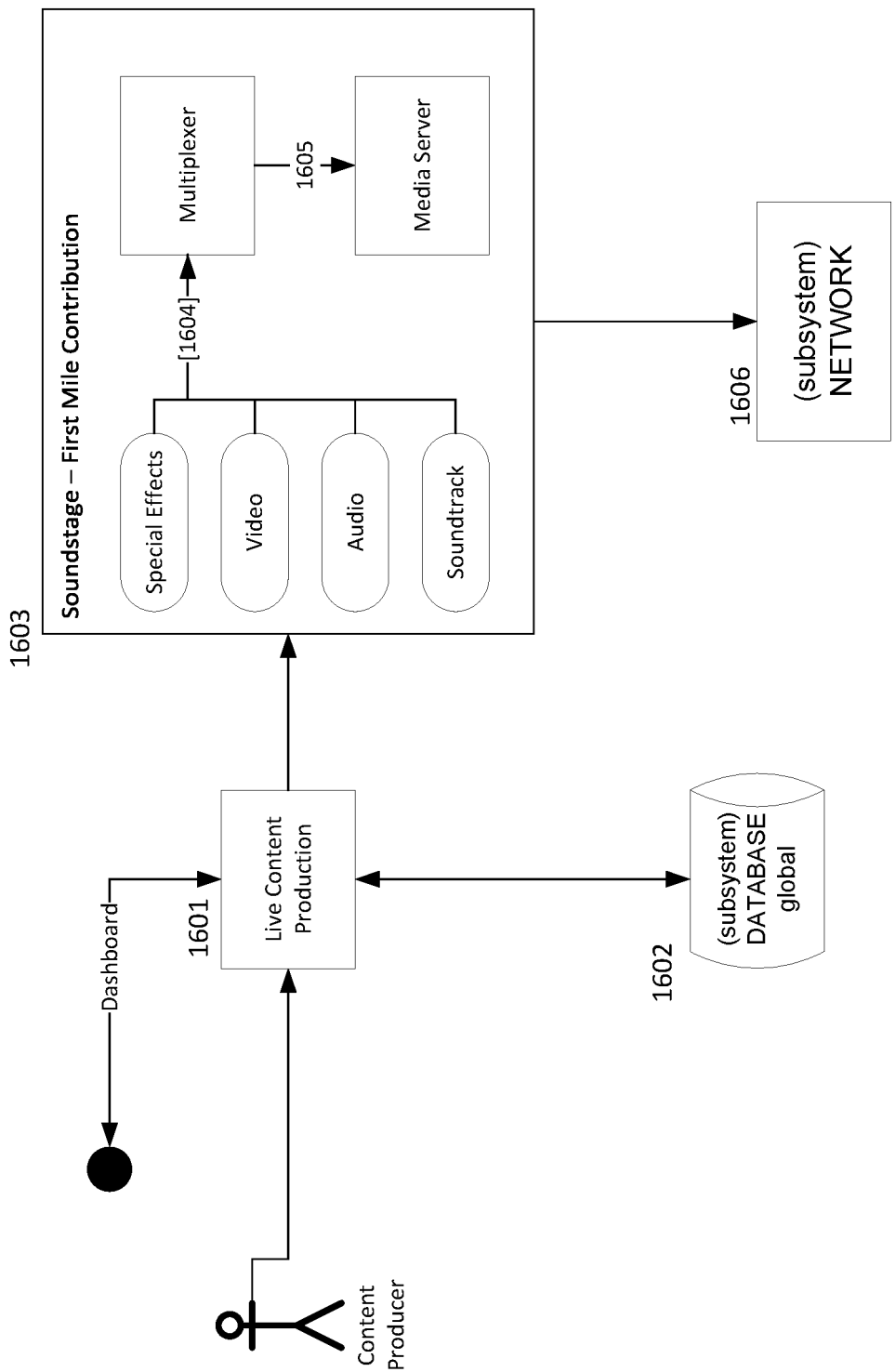
FIG. 16 is a flowchart of the Ingest or "first mile" contribution of the Live Content Production Network according to the embodiment of the invention shown in FIG. 13.

FIG. 16 is a flowchart of the Ingest or "first mile" contribution of the Live Content Production Network according to the embodiment of the invention shown in FIG. 13. Content Producers use the Soundstage 1603 to broadcast a Live Content Production 1601. Metadata and real-time statistics and data relevant to the production are stored in the global database 1602. Special effects, video, audio (voice), and the soundtrack are combined by a multiplexer 1604 and then unicast via a media server 1605 to the network 1606.

Figure 17:
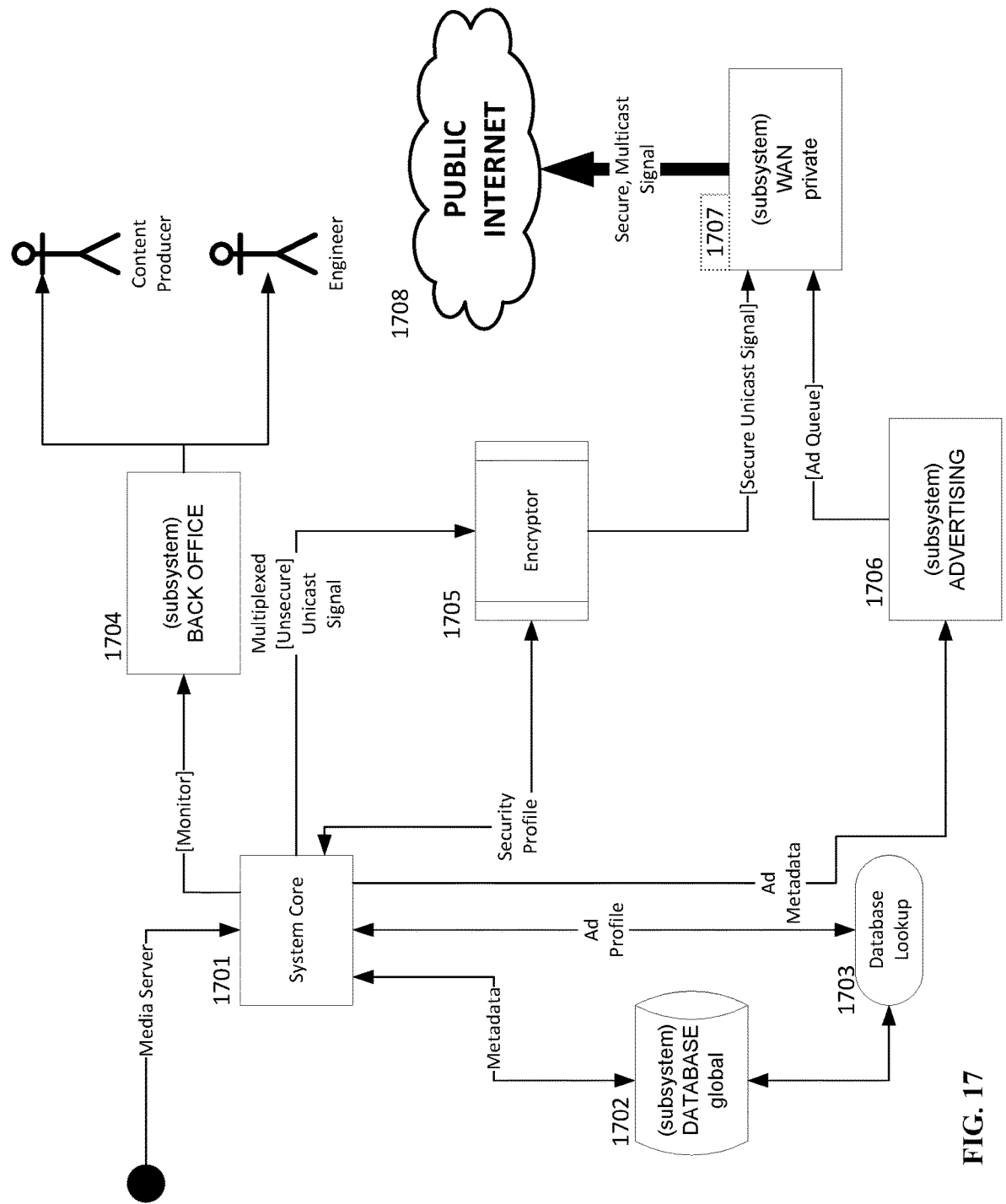
FIG. 17 is a flowchart of the Scaling contribution of the Live Content Production Network according to the embodiment of the invention shown in FIG. 13.

FIG. 17 is a flowchart of the Scaling contribution of the Live Content Production Network according to the embodiment of the invention shown in FIG. 13. When the media server broadcasts the unicast signal to the System Core 1701, the core retrieves relevant data from the global database 1702. The system also performs a lookup to retrieve advertisement data, using a specific ad profile, to assemble an advertisement queue in the Advertising subsystem 1706. Ads for the pre-show and digital surfaces are presented to the WAN 1707 along with a multiplexed, unencrypted signal from the soundstage. A security profile, which contains keys, encryption algorithms, and other data, is used to encrypt the multiplexed signal before it is sent into the private WAN 1707. Inside the WAN, the signal is multiplied up to thousands of times and prepared for multicast. The final secure, multicast signal is sent via the public internet 1708 to multiple destinations for egress or last mile delivery. The concept of multicasting live performances to thousands of theaters has not been attempted due to technological limitations and inadequate processes. The internet is not multicasting, which presents a major technical challenge. Streaming providers such as Netflix and YouTube unicast their content to millions of subscribers. They accomplish this by deploying datacenters and "cache servers" which are geographically dispersed all around the world so the distance the "moviepackets" must travel from source to destination devices (home television or mobile device) is as short as possible, offering the "best" Quality of Experience (QoE); however, this QoE is variable and dependent on available bandwidth at the destination. This offers an inconsistent QoE across viewing devices. Video streaming through unguaranteed paths on the internet will result in loss of quality, so an embodiment of the invention's system is logically segregated into a distinct network that does the work to multicast the unicast signal. Aspects of the invention enable multicasting via the public internet. The unicast broadcast is multiplied from the source inside a private WAN and the moviepackets are delivered intact to thousands of theaters simultaneously across the public internet with low latency, no moviepacket loss, and high QoE at any distance.

Aspects of the invention overcome high packet loss rates to avoid serious video quality degradation in theaters. The packetized video is indistinguishable from DVD content to moviegoers. Aspects of the invention operate at a lower cost than existing unicast solutions. This is a significant advantage over existing content distribution systems. Aspects of the invention are not "high bandwidth" dependent and can deliver High Definition (HD) multimedia signals to theaters equipped with a basic, low-cost Digital Subscriber Line (DSL) over any distance with consistently high QoE. Another advantage of aspects of the invention is that it supports bi-directional video and audio so moviegoers may interact with the performer(s). This same feature of aspects of the invention addresses antipiracy more effectively than the legacy distribution system. Live Content Productions are at greater risk of piracy and must be protected at a greater level than traditional movie theater films. Aspects of the invention use physical security video and data analytics to perform safety and antipiracy related tasks, including but not limited to checking moviegoers' temperature and identifying moviegoers' attempts to illegally record Live Content Productions with a mobile phone inside the theater entertainment pods. This feature of the system can be accessed remotely by distributor leadership and security practitioners. Aspects of the invention also employ end-to-end encryption without degrading performance and throughput.

Figure 18:
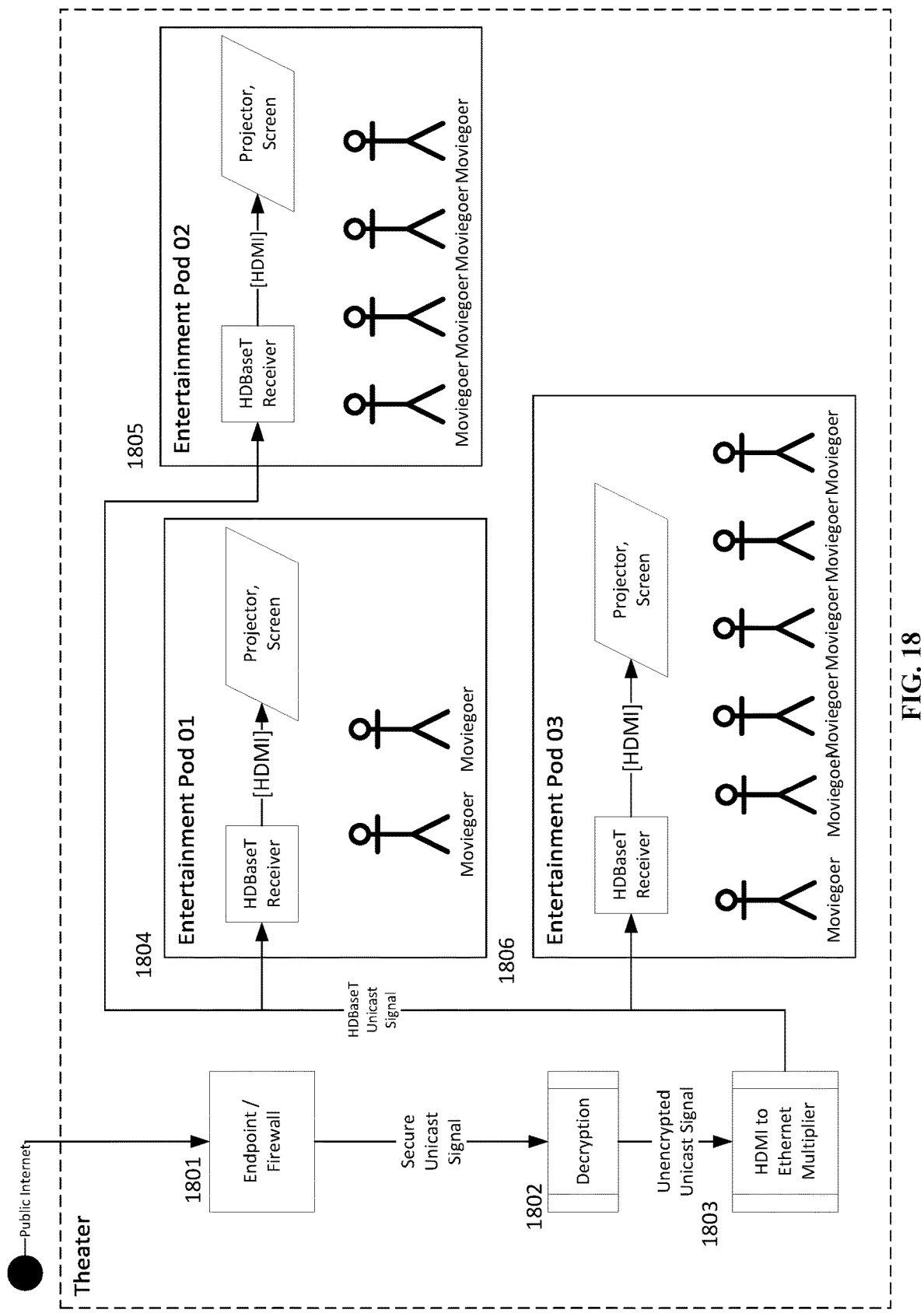
FIG. 18 is a flowchart of the Egress or "last mile" contribution of the Live Content Production Network according to the embodiment of the invention shown in FIG. 13.

FIG. 18 is a flowchart of the Egress or "last mile" contribution of the Live Content Production Network according to the embodiment of the invention shown in FIG. 13. Theaters receive an encrypted unicast signal at the endpoint 1801. The signal is decrypted 1802, multiplied 1803, and transmitted over ethernet via the HDBaseT protocol to receivers in private entertainment pods, located inside the theaters. Each pod is configured based on party size. For example, Entertainment Pod 01 1804 is sized for a couple while Entertainment Pod 03 is sized for a party of six.

The unencrypted unicast signal is broadcast in HDMI format from each receiver to the projector and screen located inside each entertainment pod.

Figure 19:
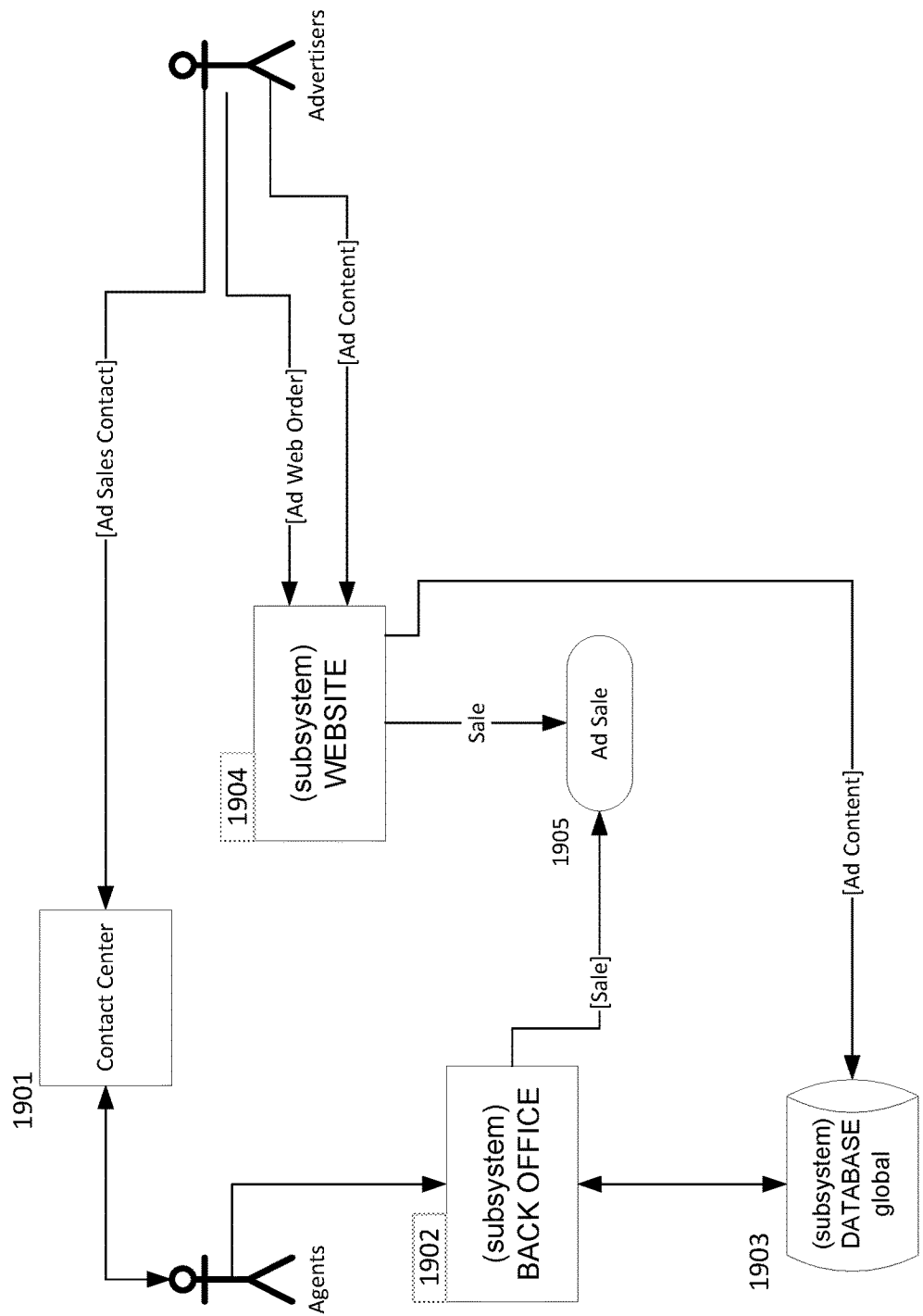
FIG. 19 is a diagrammatic illustration of a computerized Live Content Production Advertisement Sales workflow according to an embodiment of the present invention.

FIG. 19 is a diagrammatic illustration of a computerized Live Content Production Customer Relations Advertisement Sales workflow according to an embodiment of the present invention. The Customer Relations subsystem is made up of parts of the Backoffice and specific areas of the Website 1902. Advertisers may use the website 1904 to purchase advertisement slots or purchase them from a sales agent via the contact center 1901. The agents use the Backoffice 1902 to make sales and provide information to advertisers. The Backoffice 1902 and the Website 1904 store data regarding the sales in the global database 1903. Once a sale is complete, the advertiser uses the Website 1904 to upload their advertising content directly to the Advertising subsystem.

Using aspects of the present invention, independent Content Producers substantially reduce the overall burden of distribution. Currently the only option for independent Content Producers to distribute their works is to use the legacy Hollywood studio-monopolized distribution system, which relies solely on film distribution companies. A film distribution company is responsible for the marketing and distribution of your films to the general public. Films can be distributed through theatrical, video on demand (Netflix, Hulu, Amazon Prime, etc.), DVD, and new media. Distribution is very expensive in this legacy system. Marketing budgets, at a minimum, must match production budgets up to $35,000,000 USD. There are two types of distribution: leasing and profit-sharing. With leasing, the distributor agrees to pay a fixed amount for the rights to distribute the film. With profit-sharing, the distributor gets a percentage of the profits made from the film. This percentage is usually between 10-50%. Printing costs are expensive too. For legacy distribution, each theater needs its own print of a film, which costs between $1,500 and $2,000 USD. Traditional films distributed via the legacy system require budget for pre-production, shooting, post-production, movie prints, advertising, and distribution. Most legacy distribution deals involve the following steps for payment: (1) the exhibition platform pays the distributor, (2) the distributor takes their distribution fee, (3) the distributor pays the sales agent, (4) the distributor recoups expenses, and (5) finally the distributor pays the filmmaker what's left. This payment cycle may continue for up to seven years. Leveraging aspects of the present invention, Content Producers do not require budget for post-production, movie prints, or distribution. Aspects of the preferred embodiment of the invention offer a Zero-Cost Distribution feature, which is a substantial improvement over the legacy distribution system and costly means of providing prints to theaters. Aspects of the invention also include Direct Licensing, a feature that electronically pays Content Producers a percentage of all ticket sales via Automated Clearing House (ACH) at End of Performance (EOP). The Content Producer sets the ticket price during the Live Content Production Proposal phase and is paid at the close of each performance. This is a significant improvement over the legacy distribution system.

Embodiments of the present disclosure may comprise a special-purpose computer including a variety of computer hardware, as described in greater detail below.

For purposes of illustration, programs and other executable program components may be shown as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with other special-purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of computing systems, environments, and/or configurations that may be suitable for use with aspects of the invention include, but are not limited to, personal computers, server computers, hand-held or laptop devices, multiprocessor systems, microprocessor-based systems, set-top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media, including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor-readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives, and uses of the aspects of the invention, including what is presently believed to be the best mode of carrying out the aspects of the invention. Additionally, it is to be understood that the aspects of the invention are not limited in their application to the details of construction and the arrangement of components set forth in the following description or illustrated in the drawings. The aspects of the invention are capable of other embodiments and of being practiced or carried out in various ways. Also, it will be understood that the phraseology and terminology used herein are for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and processes without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved, and other advantageous results attained.

What is claimed is:

1. A method of mass distribution of independent live content comprising:
  accepting input of live content production proposal data by one or more user interfaces coupled to a media server, the media server operating a website displayed on the one or more user interfaces;
  storing live content production proposal data in a database coupled to the media server;
  providing notification to the one or more user interfaces that input of live content production proposal data is complete;
  displaying on the one or more user interfaces live content production proposal data;
  accepting input via the one or more user interfaces of review data for the live content production proposal data;
  storing review data for the live content production proposal data in the database;
  accepting input by the one or more user interfaces of live content production data in accordance with the live content production proposal data;
  storing the live content production data in the database;
  receiving, by the media server, live content comprising a real-time broadcast of a live performance associated with the live content production data;
  storing live content in the database;
  generating by the media server, a content signal representative of the received live content and associated live content production data;
  encrypting, by a multicast network coupled to the media server, the content signal and multiplying the encrypted content signal to generate a multicast signal, the multicast signal comprising a plurality of encrypted unicast signals;
  transmitting, by the multicast network, the multicast signal via a data communication network to one or more receivers coupled to the multicast network via the data communication network.

2. The method of claim 1, further comprising combining, by a multiplexer coupled to the media server, one or more features with the content, and wherein the content signal generated by the media server is representative of the content combined with the one or more features.

3. The method of claim 1, wherein the content signal generated by the media server comprises metadata.

4. The method of claim 1, wherein the encrypted unicast signals of the multicast signal comprise identical packetized video signals.

5. The method of claim 1, wherein the multicast network comprises a Wide Area Network (WAN) for multiplying the encrypted content signal to generate a multicast signal.

6. The method of claim 2, wherein the one or more features comprise at least one of special effects, video, audio, and a soundtrack.

7. The method of claim 3, further comprising retrieving, by the multicast network, one or more advertisements based on the metadata and queuing the retrieved advertisements for transmission by the multicast network with the multicast signal.

8. The method of claim 3, further comprising storing the metadata by the database coupled to the media server, and wherein the metadata comprises the live content production data.

9. The method of claim 8, wherein the live content production data comprises one or more of the following: title, duration, genre, film rating, cast, director, synopsis, budgets, costs, set buildouts, announcements, runtime, schedule, set configurations, technology loadouts, and scene workflows.

* * * * *